United States Patent
Yang et al.

(10) Patent No.: US 12,147,583 B2
(45) Date of Patent: Nov. 19, 2024

(54) SYSTEM AND METHOD FOR PROTECTING DEEP IMAGE CLASSIFIERS

(71) Applicant: BicDroid Inc., Petersburg (CA)

(72) Inventors: En-hui Yang, Petersburg (CA); Chen Sun, Nanjing (CN)

(73) Assignee: BicDroid Inc., Petersburg (CA)

( * ) Notice: Subject to any disclaimer, the term of this patent is extended or adjusted under 35 U.S.C. 154(b) by 281 days.

(21) Appl. No.: 17/719,525

(22) Filed: Apr. 13, 2022

(65) Prior Publication Data

US 2022/0343026 A1 Oct. 27, 2022

Related U.S. Application Data

(60) Provisional application No. 63/175,105, filed on Apr. 15, 2021.

(51) Int. Cl.
*G06F 21/64* (2013.01)
*G06F 21/60* (2013.01)
*G06T 1/00* (2006.01)

(52) U.S. Cl.
CPC .............. *G06F 21/64* (2013.01); *G06T 1/005* (2013.01); *G06T 1/0092* (2013.01); *G06T 2201/0065* (2013.01)

(58) Field of Classification Search
CPC ....... G06F 21/64; G06T 1/005; G06T 1/0092; G06T 2201/0065; G06T 2201/0052; G06N 3/094

(Continued)

(56) References Cited

U.S. PATENT DOCUMENTS

| 6,064,764 A * | 5/2000 | Bhaskaran ......... H04N 1/32154 |
| | | 382/100 |
| 2003/0059086 A1* | 3/2003 | Hayashi .................. G06T 1/005 |
| | | 382/232 |

(Continued)

FOREIGN PATENT DOCUMENTS

| CN | 112561770 A * | 3/2021 | ........... G06T 1/0042 |
| WO | 2020142110 A1 | 7/2020 | |

OTHER PUBLICATIONS

I.J. Information Technology and Computer Science, 2019, 3, 23-37 Published Online Mar. 2019 in MECS (http://www.mecs-press.org/) DOI: 10.5815/ijitcs.2019.03.23 Attacking Image Watermarking and Steganography—A Survey.*

(Continued)

*Primary Examiner* — Emmanuel L Moise
*Assistant Examiner* — Berhanu Shitayewoldetadik

(57) ABSTRACT

A system, method and computer program product for protecting a deep neural network image classifier against receiving perturbed images. A plurality of watermark bits are embedded into an original digital image intended for the deep neural network image classifier. The watermarked image is transmitted through a potentially adversarial environment. A potentially perturbed image intended for the deep neural network image classifier is received from the potentially adversarial environment. The potentially perturbed image is determined to be an adversely modified or benign image by determining whether the potentially perturbed image includes a plurality of embedded bits matching the plurality of watermark bits embedded into the original digital image. The potentially perturbed image is prevented from being provided to the deep neural network image classifier in response to determining that the potentially perturbed image is the adversely modified image.

20 Claims, 7 Drawing Sheets

(58) Field of Classification Search
USPC .......................................................... 713/176
See application file for complete search history.

(56) References Cited

U.S. PATENT DOCUMENTS

| | | | | |
|---|---|---|---|---|
| 2004/0146160 | A1* | 7/2004 | Nomizu | H04N 1/32309 380/200 |
| 2005/0129271 | A1* | 6/2005 | Shi | H04N 19/46 382/276 |
| 2005/0226460 | A1* | 10/2005 | Moskowitz | G06T 1/005 382/100 |
| 2006/0056653 | A1* | 3/2006 | Kunisa | G06T 1/005 382/100 |
| 2008/0002852 | A1* | 1/2008 | Dixit | H04N 1/32288 382/100 |
| 2019/0325276 | A1* | 10/2019 | Fu | G06N 3/084 |
| 2020/0126187 | A1* | 4/2020 | Park | H04N 19/85 |
| 2021/0034919 | A1* | 2/2021 | Wu | G06V 30/274 |
| 2021/0150703 | A1* | 5/2021 | Levanony | G06N 3/045 |
| 2021/0334968 | A1* | 10/2021 | Peng | G06N 3/047 |
| 2022/0076045 | A1* | 3/2022 | Sakamoto | G06V 10/44 |
| 2022/0189187 | A1* | 6/2022 | Narumi | G06T 7/11 |
| 2022/0277187 | A1* | 9/2022 | Wang | G06N 3/0455 |
| 2023/0276070 | A1* | 8/2023 | Yang | H04N 19/188 375/240.03 |
| 2023/0394282 | A1* | 12/2023 | Wang | G06N 3/0464 |

OTHER PUBLICATIONS

Wang et al., "A Novel Fast Self-restoration Semi-fragile Watermarking Algorithm for Image Content Authentication Resistant to JPEG Compression", IWDW 2011: Digital Forensics and Watermarking, Oct. 23, 2011, pp. 1-15.

Qin et al., "Fragile image watermarking scheme based on VQ index sharing and self-embedding", Multimedia Tools and Applications, Jan. 11, 2016, vol. 76, pp. 2267-2287.

Sun et al., "A Watermarking-Based Framework for Protecting Deep Image Classifiers Against Adversarial Attacks", 2021 IEEE/CVF Conference on Computer Vision and Pattern Recognition Workshops (CVPRW), Jun. 19, 2021, pp. 3324-3333.

Egorova et al., "Semi-Fragile Watermarking for JPEG Image Authentication: A Comparative Study", 2019 7th International Symposium on Digital Forensics and Security (ISDFS), Jun. 10, 2019, pp. 1-6.

Bravo-Solorio et al., "Fast fragile watermark embedding and iterative mechanism with high self-restoration performance", Digital Signal Processing, Feb. 2018, https://doi.org/10.1016/j.dsp.2017.11.005, vol. 73, pp. 83-92.

Abadi et al., "Tensorflow: A system for large-scale machine learning", 12th USENIX symposium on operating systems design and implementation (OSDI 16), 2016.

Papernot, et al., "Practical black-box attacks against machine learning", Proceedings of the 2017 ACM on Asia conference on computer and communications security, 2017.

Biggio et al., "Evasion attacks against machine learning at test time", Joint European conference on machine learning and knowledge discovery in databases, Springer, Berlin, Heidelberg, 2013.

Carlini et al;, "Adversarial examples are not easily detected: Bypassing ten detection methods", Proceedings of the 10th ACM Workshop on Artificial Intelligence and Security, 2017.

Carlini et al., "Towards evaluating the robustness of neural networks", IEEE symposium on security and privacy, 2017.

Alzantot et al., "Genattack" Practical black-box attacks with gradient-free optimization, Proceedings of the Genetic and Evolutionary Computation Conference, 2019.

Das et al., "Shield: Fast, practical defense and vaccination for deep learning using jpeg compression", Proceedings of the 24th ACM SIGKDD International Conference on Knowledge Discovery & Data Mining, 2018.

Deng et al., "Imagenet: A large-scale hierarchical image database", 2009 IEEE conference on computer vision and pattern recognition, 2009.

Gilmer et al., "Adversarial spheres", arXiv preprint arXiv:1801.02774, 2018.

Goodfellow et al., "Explaining and harnessing adversarial examples", arXiv preprint arXIV:1412.6572, 2014.

Guo et al., "Countering adversarial images using input transformations", arXiv preprint arXiv:1711.00117.

He et al., "Identity mappings in deep residual networks", European conference on computer vision, Springer, Cham, 2016.

Lin et al., "A robust image authentication method distinguishing JPEG compression from malicious manipulation", IEEE Transations on Circuits and Systems for Video Technology, 11.2, 2001: 153-168.

Madry et al., "Towards deep learning models resistant to adversarial attacks", arXiv preprint arXiv:1706.060083, 2017.

Meng et al., "Magnet: a tow-pronged defense against adversarial examples", Proceedings of the 2017 ACM SIGSAC conference on computer and communications security, 2017.

Metzen et al., "On detecting adversarial perturbations", arXiv preprint arXiv:1702:04267, 2017.

Ozdemir et al., "A Quality Control Application on a Smart Factory Prototype Using Deep Learning Methods", 2019 IEEE 14th International Conference on Computer Sciences and Information Technologies (CSIT), vol. 1, IEEE, 2019.

Papernot, et al., "Technical report on the cleverhans v2. 1.0 adversarial examples library", arXiv preprint arXiv:1610:00768, 2016.

Samangouei et al., "Defense-gan: Protecting classifiers against adversarial attacks using generative models", arXiv preprint arXiv:1805:06605, 2018.

Sandler et al., "Mobilenetv2: Inverted residuals and linear bottlenecks", Proceedings of the IEEE conference on computer vision and pattern recognition, 2018.

Sharma et al., "On the effectiveness of low frequency perturbations", arXiv preprint arXiv:1903.00073, 2019.

Shin et al., "Jpeg-resistant adversarial images", NIPS 2017 Workshop on Machine Learning and Computer Security, vol. 1, 2017.

Szegedy et al., "Rethinking the inception architecture for computer vision", Proceedings of the IEEE conference on computer vision and pattern recognition, 2016.

Tsuzuku et al., "On the structural sensitivity of deep convolutional networks to the directions of fourier basis functions", Proceedings of the IEEE/CVF Conference on Computer Vision and Pattern Recognition, 2019.

Villalba-Diez et al., "Deep learning for industrial computer vision quality control in the printing industry 4.0", Sensors 19.18, 2019: 3987.

The International Search Report and the Written Opinion mailed Jun. 21, 2022 in respect of PCT/CA2022/050569.

* cited by examiner

SYSTEM AND METHOD FOR PROTECTING DEEP IMAGE CLASSIFIERS

CROSS-REFERENCE TO RELATED APPLICATIONS

This application claims the benefit of U.S. Provisional Application No. 63/175,105 filed on Apr. 15, 2021, which is incorporated by reference herein in its entirety.

FIELD

This document relates to systems and methods for managing images being provided to image classifiers. In particular, this document relates to preventing perturbed images from being provided as inputs to deep neural network image classifiers.

BACKGROUND

In recent years, Deep Neural Networks (DNNs) have demonstrated tremendous potential and success for many image related tasks, such as image classification, facial recognition, and autonomous driving applications. Unfortunately, DNNs are also known to be vulnerable to adversarial examples—subtly crafted, but imperceptible modifications of benign inputs which, once fed into DNNs, can lead DNNs to produce incorrect outputs.

Given an original benign image x, a small perturbation can be easily crafted and added to x to generate a modified image x'. The perturbation can be defined such that the output of a DNN in response to x' will be different from that of the DNN in response to x. The perturbed image x' is an adversarial example for the original image x. The existence and easy construction of adversarial examples poses significant security risks to DNNs, especially in safety-critical applications such as facial recognition and autonomous driving for example.

To safeguard DNNs against adversarial attacks, one approach is to build a classifier that distinguishes adversarial examples from natural images. The rationale is that although the adversarial perturbations are imperceptible to human eyes, it may be still possible to design an algorithm to detect their existence. Along this line, several detection-based methods have been proposed (see, for example, Meng, Dongyu, and Hao Chen. "Magnet: a two-pronged defense against adversarial examples." Proceedings of the 2017 ACM SIGSAC conference on computer and communications security. 2017; Metzen, Jan Hendrik, et al. "On detecting adversarial perturbations." arXiv preprint arXiv: 1702.04267 (2017); and Samangouei, Pouya, Maya Kabkab, and Rama Chellappa. "Defense-gan: Protecting classifiers against adversarial attacks using generative models." arXiv preprint arXiv:1805.06605 (2018)). Some detection-based methods focus on finding general intrinsic properties of adversarial examples. Other detection-based methods aim to train classification networks to distinguish adversarial examples from benign images.

Detection-based defenses can be effective, to some extent, against specific adversarial attacks. However, detection-based approaches have proven vulnerable to more advanced adaptive adversaries—adversaries having full knowledge of the DNN to be secured and the detection strategy being used. Indeed a recent study of 10 detection-based defenses found that adaptive adversaries can be designed to defeat them all (see Carlini, Nicholas, and David Wagner. "Adversarial examples are not easily detected: Bypassing ten detection methods." Proceedings of the 10th ACM Workshop on Artificial Intelligence and Security. 2017). Adversarial perturbations do not appear to share a general pattern or intrinsic property, leading to challenges in developing detection-based defenses suitable for protecting against all forms of adversarial perturbations. As such, improved approaches to protecting deep neural networks are desirable.

SUMMARY

The following summary is intended to introduce the reader to various aspects of the detailed description, but not to define or delimit any invention.

Systems, methods and computer program products for protecting deep neural networks is provided. More particularly, in some examples, a plurality of watermark bits can be embedded into a digital image that is ultimately intended for a deep neural network image classifier. The watermarked image can be transmitted through a potentially adversarial environment. A potentially perturbed image intended for the deep neural network image classifier can be received from the potentially adversarial environment. The potentially perturbed image can be analyzed to determine whether the potentially perturbed image includes a plurality of embedded bits matching the plurality of watermark bits embedded into the original digital image. The potentially perturbed image can be identified as an adversely modified image or benign image based on the comparison of the embedded bits and the expected watermark bits. The potentially perturbed image can be prevented from being provided to the deep neural network image classifier in response to determining that the potentially perturbed image is adverse. Benign images, on the other hand, can be provided as inputs to the deep neural network image classifier.

According to some aspects, the present disclosure provides a method for protecting a deep neural network image classifier against receiving perturbed images, the method comprising: acquiring an original digital image intended for the deep neural network image classifier; generating a watermarked image by embedding a plurality of watermark bits into the original digital image; transmitting the watermarked image through a potentially adversarial environment; receiving a potentially perturbed image from the potentially adversarial environment, wherein the potentially perturbed image is intended for the deep neural network image classifier; determining whether the potentially perturbed image is an adversely modified or benign image by determining whether the potentially perturbed image includes a plurality of embedded bits matching the plurality of watermark bits embedded into the original digital image, wherein the potentially perturbed image is determined to be the benign image when the potentially perturbed image includes the plurality of embedded bits matching the plurality of watermark bits and the potentially perturbed image is determined to be the adversely modified image otherwise; and preventing the potentially perturbed image from being provided to the deep neural network image classifier in response to determining that the potentially perturbed image is the adversely modified image.

The method can include providing the potentially perturbed image to the deep neural network image classifier in response to determining that the potentially perturbed image is the benign image.

Determining whether the potentially perturbed image includes the plurality of embedded bits matching the plurality of watermark bits embedded into the original digital image can include: determining a bit error rate based on comparing the embedded bits with the watermark bits, where the bit error rate represents a percentage of the embedded bits that are distorted with respect to the corresponding watermark bits; and determining that the potentially perturbed image includes the plurality of embedded bits matching the plurality of watermark bits when the bit error rate is less than an error rate threshold.

The error rate threshold may be at most 1%.

Determining whether the potentially perturbed image includes the plurality of embedded bits matching the plurality of watermark bits can include: identifying a plurality of embedded coefficients of the potentially perturbed image using a secret key associated with the original digital image; extracting a plurality of potentially watermarked bits from the plurality of embedded coefficients; and determining whether the plurality of potentially watermarked bits correspond to the plurality of watermark bits.

Extracting the plurality of potentially watermarked bits can include: identifying a plurality of potentially watermarked coefficients in the plurality of embedded coefficients; determining an estimated reference bit; for each potentially watermarked coefficient, extracting the potentially watermarked bit from that potentially watermarked coefficient by: determining an estimated embedding value based on one or more specified bits of that potentially watermarked coefficient; and determining the potentially watermarked bit using the estimated embedding value and the estimated reference bit.

The estimated reference bit can be determined by: determining a reference coefficient in the plurality of embedded coefficients; determining a reference bit location using a reference switch value associated with the original digital image; and determining the estimated reference bit as the bit value at the reference bit location of the reference coefficient.

Embedding the plurality of watermark bits into the original digital image can include: identifying a plurality of watermark embedding coefficients in the original digital image; and for each watermark embedding coefficient, embedding a corresponding embedding value into that watermark embedding coefficient.

Embedding the plurality of watermark bits into the original digital image can include: identifying at least one reference embedding coefficient in the original digital image; and for each reference embedding coefficient, determining a corresponding reference bit from that reference embedding coefficient.

Each embedding value can be defined using the reference bit and a corresponding watermark bit.

The at least one reference embedding coefficient can be determined using a secret key associated with the original digital image.

The plurality of watermark embedding coefficients can be determined using a secret key associated with the original digital image.

Embedding the plurality of watermark bits into the original digital image can include: identifying a plurality of digital image blocks contained in the original digital image; and embedding a plurality of block specific watermark bits into each digital image block.

According to some aspects, there is also provided a system for protecting a deep neural network image classifier against receiving perturbed images, the system comprising: an image acquisition device; and a watermark encoder coupled to the image acquisition device; and a detector coupled to the deep neural network image classifier; wherein the image acquisition device is configured to acquire an original digital image intended for the deep neural network image classifier; the watermark encoder is configured to: generate a watermarked image by embedding a plurality of watermark bits into the original digital image; and transmit the watermarked image through a potentially adversarial environment; and the detector is configured to: receive a potentially perturbed image from the potentially adversarial environment, wherein the potentially perturbed image is intended for the deep neural network image classifier; determine whether the potentially perturbed image is an adversely modified or benign image by determining whether the potentially perturbed image includes a plurality of embedded bits matching the plurality of watermark bits embedded into the original digital image, wherein the potentially perturbed image is determined to be the benign image when the potentially perturbed image includes the plurality of embedded bits matching the plurality of watermark bits and the potentially perturbed image is determined to be the adversely modified image otherwise; and prevent the potentially perturbed image from being provided to the deep neural network image classifier in response to determining that the potentially perturbed image is the adversely modified image.

The detector can be configured to provide the potentially perturbed image to the deep neural network image classifier in response to determining that the potentially perturbed image is the benign image.

The detector can be configured to determine whether the potentially perturbed image includes the plurality of embedded bits matching the plurality of watermark bits embedded into the original digital image by: determining a bit error rate based on comparing the embedded bits with the watermark bits, where the bit error rate represents a percentage of the embedded bits that are distorted with respect to the corresponding watermark bits; and determining that the potentially perturbed image includes the plurality of embedded bits matching the plurality of watermark bits when the bit error rate is less than an error rate threshold.

The error rate threshold can be at most 1%.

The detector can be configured to determine whether the potentially perturbed image includes the plurality of embedded bits matching the plurality of watermark bits by: identifying a plurality of embedded coefficients of the potentially perturbed image using a secret key associated with the original digital image; extracting a plurality of potentially watermarked bits from the plurality of embedded coefficients; and determining whether the plurality of potentially watermarked bits correspond to the plurality of watermark bits.

The detector can be configured to extract the plurality of potentially watermarked bits by: identifying a plurality of potentially watermarked coefficients in the plurality of embedded coefficients; determining an estimated reference bit; for each potentially watermarked coefficient, extracting the potentially watermarked bit from that potentially watermarked coefficient by: determining an estimated embedding value based on one or more specified bits of that potentially watermarked coefficient; and determining the potentially watermarked bit using the estimated embedding value and the estimated reference bit.

The detector can be configured to determine the estimated reference bit by: determining a reference coefficient in the plurality of embedded coefficients; determining a reference bit location using a reference switch value associated with the original digital image; and determining the estimated reference bit as the bit value at the reference bit location of the reference coefficient.

The watermark encoder can be configured to embed the plurality of watermark bits into the original digital image by: identifying a plurality of watermark embedding coefficients in the original digital image; and for each watermark embedding coefficient, embedding a corresponding embedding value into that watermark embedding coefficient.

The watermark encoder can be configured to embed the plurality of watermark bits into the original digital image by: identifying at least one reference embedding coefficient in the original digital image; and for each reference embedding coefficient, determining a corresponding reference bit from that reference embedding coefficient.

The watermark encoder can be configured to define each embedding value using the reference bit and a corresponding watermark bit.

The watermark encoder can be configured to determine the at least one reference embedding coefficient using a secret key associated with the original digital image.

The watermark encoder can be configured to determine the plurality of watermark embedding coefficients using a secret key associated with the original digital image.

The watermark encoder can be configured to embed the plurality of watermark bits into the original digital image by: identifying a plurality of digital image blocks contained in the original digital image; and embedding a plurality of block specific watermark bits into each digital image block.

According to some aspects, there is provided a non-transitory computer readable medium storing computer-executable instructions, which, when executed by a computer processor, cause the computer processor to carry out a method for protecting a deep neural network image classifier against receiving perturbed images. The method includes acquiring an original digital image intended for the deep neural network image classifier; generating a watermarked image by embedding a plurality of watermark bits into the original digital image; transmitting the watermarked image through a potentially adversarial environment; receiving a potentially perturbed image from the potentially adversarial environment, wherein the potentially perturbed image is intended for the deep neural network image classifier; determining whether the potentially perturbed image is an adversely modified or benign image by determining whether the potentially perturbed image includes a plurality of embedded bits matching the plurality of watermark bits embedded into the original digital image, wherein the potentially perturbed image is determined to be the benign image when the potentially perturbed image includes the plurality of embedded bits matching the plurality of watermark bits and the potentially perturbed image is determined to be the adversely modified image otherwise; and preventing the potentially perturbed image from being provided to the deep neural network image classifier in response to determining that the potentially perturbed image is the adversely modified image The non-transitory computer readable medium can store computer-executable instructions, which, when executed by a computer processor, cause the computer processor to carry out the method for protecting a deep neural network image classifier against receiving perturbed images, where the method is described herein.

According to some aspects, the present disclosure provides a method for preventing perturbed images from being provided to a deep neural network image classifier, the method comprising: receiving a potentially perturbed image from a potentially adversarial environment, wherein the potentially perturbed image is intended for the deep neural network image classifier; identifying a secret key associated with the original digital image of the potentially perturbed image; determining a plurality of expected watermark bits associated with the secret key; determining whether the potentially perturbed image is an adversely modified or benign image by determining whether the potentially perturbed image includes a plurality of embedded bits matching the plurality of expected watermark bits, wherein the potentially perturbed image is determined to be the benign image when the potentially perturbed image includes the plurality of embedded bits matching the plurality of expected watermark bits and the potentially perturbed image is determined to be the adversely modified image otherwise; and preventing the potentially perturbed image from being provided to the deep neural network image classifier in response to determining that the potentially perturbed image is the adversely modified image.

The method can include providing the potentially perturbed image to the deep neural network image classifier in response to determining that the potentially perturbed image is the benign image.

Determining whether the potentially perturbed image includes the plurality of embedded bits matching the plurality of expected watermark bits can include: determining a bit error rate based on comparing the embedded bits with the expected watermark bits, where the bit error rate represents a percentage of the embedded bits that are distorted with respect to the corresponding expected watermark bits; and determining that the potentially perturbed image includes the plurality of embedded bits matching the plurality of expected watermark bits when the bit error rate is less than an error rate threshold.

The error rate threshold can be at most 1%.

Determining whether the potentially perturbed image includes the plurality of embedded bits matching the plurality of expected watermark bits can include: identifying a plurality of embedded coefficients of the potentially perturbed image using the secret key associated with the original digital image; extracting a plurality of potentially watermarked bits from the plurality of embedded coefficients; and determining whether the plurality of potentially watermarked bits correspond to the plurality of expected watermark bits.

Extracting the plurality of potentially watermarked bits can include: identifying a plurality of potentially watermarked coefficients in the plurality of embedded coefficients; determining an estimated reference bit; for each potentially watermarked coefficient, extracting the potentially watermarked bit from that potentially watermarked coefficient by: determining an estimated embedding value based on one or more specified bits of that potentially watermarked coefficient; and determining the potentially watermarked bit using the estimated embedding value and the estimated reference bit.

The estimated reference bit can be determined by: determining a reference coefficient in the plurality of embedded coefficients; determining a reference bit location using a reference switch value associated with the original digital image; and determining the estimated reference bit as the bit value at the reference bit location of the reference coefficient.

Receiving the potentially perturbed image can include receiving a plurality of potentially perturbed image blocks; and determining whether the potentially perturbed image includes a plurality of embedded bits matching the plurality of expected watermark bits can include determining, for each potentially perturbed image block, whether that potentially perturbed image block includes a plurality of block-specific embedded bits matching a plurality of block-specific expected watermark bits of a corresponding original image block of the original digital image.

According to some aspects, there is also provided a system for preventing perturbed images from being provided to a deep neural network image classifier, the system comprising: one or more processors coupled to the deep neural network image classifier; and a non-transitory memory storing instructions executable by the one or more processors; wherein the one or more processors are configured by the instructions to: receive a potentially perturbed image from a potentially adversarial environment, wherein the potentially perturbed image is intended for the deep neural network image classifier; identify a secret key associated with the original digital image of the potentially perturbed image; determine a plurality of expected watermark bits associated with the secret key; determine whether the potentially perturbed image is an adversely modified or benign image by determining whether the potentially perturbed image includes a plurality of embedded bits matching the plurality of expected watermark bits, wherein the potentially perturbed image is determined to be the benign image when the potentially perturbed image includes the plurality of embedded bits matching the plurality of expected watermark bits and the potentially perturbed image is determined to be the adversely modified image otherwise; and prevent the potentially perturbed image from being provided to the deep neural network image classifier in response to determining that the potentially perturbed image is the adversely modified image.

The one or more processors can be configured to provide the potentially perturbed image to the deep neural network image classifier in response to determining that the potentially perturbed image is the benign image.

The one or more processors can be configured to determine whether the potentially perturbed image includes the plurality of embedded bits matching the plurality of expected watermark bits by: determining a bit error rate based on comparing the embedded bits with the expected watermark bits, where the bit error rate represents a percentage of the embedded bits that are distorted with respect to the corresponding expected watermark bits; and determining that the potentially perturbed image includes the plurality of embedded bits matching the plurality of expected watermark bits when the bit error rate is less than an error rate threshold.

The error rate threshold can be at most 1%.

The one or more processors can be configured to determine whether the potentially perturbed image includes the plurality of embedded bits matching the plurality of expected watermark bits by: identifying a plurality of embedded coefficients of the potentially perturbed image using the secret key associated with the original digital image; extracting a plurality of potentially watermarked bits from the plurality of embedded coefficients; and determining whether the plurality of potentially watermarked bits correspond to the plurality of expected watermark bits.

The one or more processors can be configured to extract the plurality of potentially watermarked bits by: identifying a plurality of potentially watermarked coefficients in the plurality of embedded coefficients; determining an estimated reference bit; for each potentially watermarked coefficient, extracting the potentially watermarked bit from that potentially watermarked coefficient by: determining an estimated embedding value based on one or more specified bits of that potentially watermarked coefficient; and determining the potentially watermarked bit using the estimated embedding value and the estimated reference bit.

The one or more processors can be configured to determine the estimated reference bit by: determining a reference coefficient in the plurality of embedded coefficients; determining a reference bit location using a reference switch value associated with the original digital image; and determining the estimated reference bit as the bit value at the reference bit location of the reference coefficient.

The one or more processors can be configured to: receive the potentially perturbed image as a plurality of potentially perturbed image blocks; and determine whether the potentially perturbed image includes a plurality of embedded bits matching the plurality of expected watermark bits by determining, for each potentially perturbed image block, whether that potentially perturbed image block includes a plurality of block-specific embedded bits matching a plurality of block-specific expected watermark bits of a corresponding original image block of the original digital image.

According to some aspects, there is provided a non-transitory computer readable medium storing computer-executable instructions, which, when executed by a computer processor, cause the computer processor to carry out a method for preventing perturbed images from being provided to a deep neural network image classifier. The method includes receiving a potentially perturbed image from a potentially adversarial environment, wherein the potentially perturbed image is intended for the deep neural network image classifier; identifying a secret key associated with the original digital image of the potentially perturbed image; determining a plurality of expected watermark bits associated with the secret key; determining whether the potentially perturbed image is an adversely modified or benign image by determining whether the potentially perturbed image includes a plurality of embedded bits matching the plurality of expected watermark bits, wherein the potentially perturbed image is determined to be the benign image when the potentially perturbed image includes the plurality of embedded bits matching the plurality of expected watermark bits and the potentially perturbed image is determined to be the adversely modified image otherwise; and preventing the potentially perturbed image from being provided to the deep neural network image classifier in response to determining that the potentially perturbed image is the adversely modified image.

The non-transitory computer readable medium can store computer-executable instructions, which, when executed by a computer processor, cause the computer processor to carry out the method for preventing perturbed images from being provided to a deep neural network image classifier, where the method is described herein.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
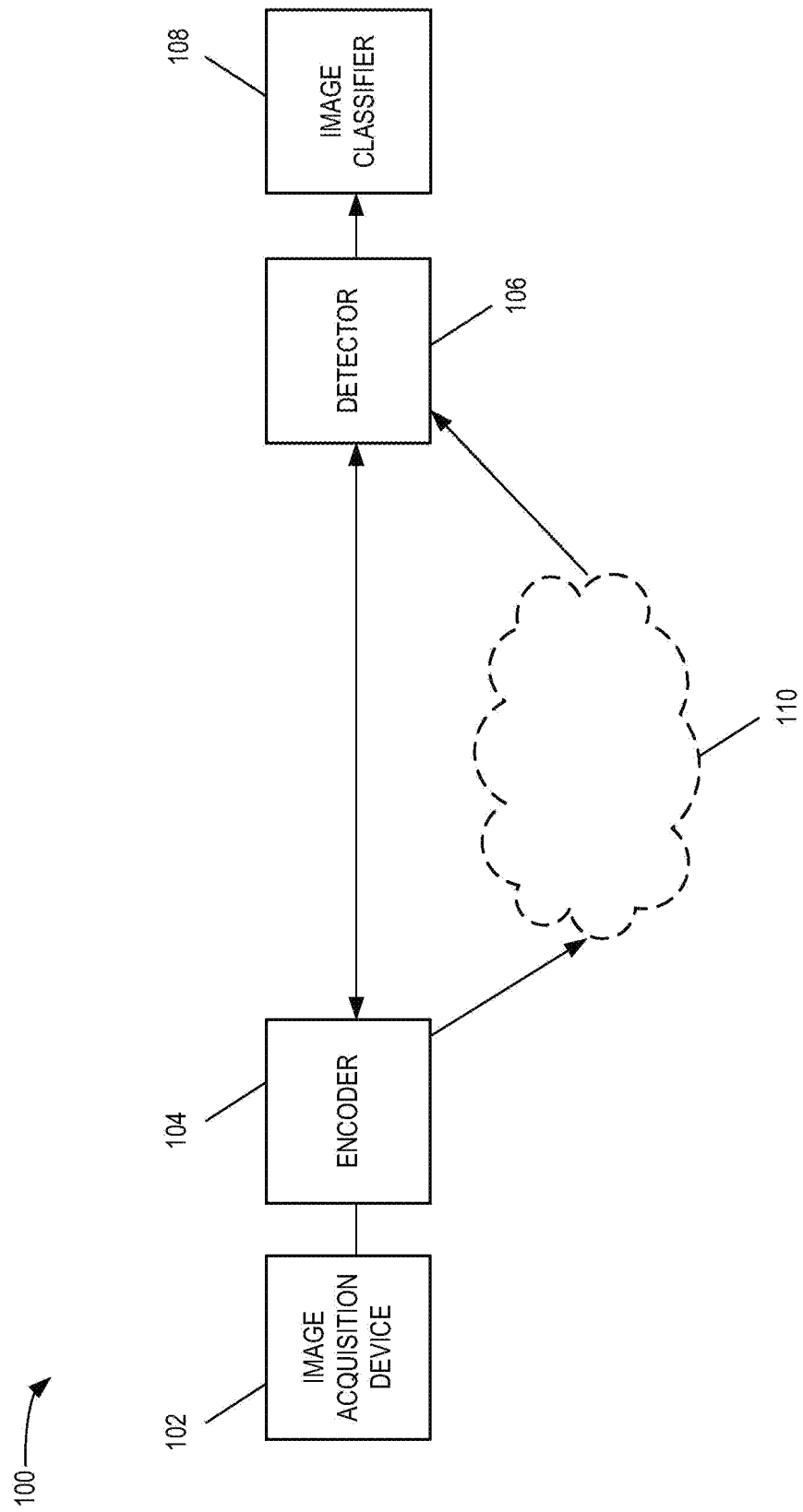
FIG. 1 is a block diagram illustrating an example of an image classification system for protecting a deep neural network image classifier.

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth in order to provide a thorough understanding of the subject matter described herein. However, it will be understood by those of ordinary skill in the art that the subject matter described herein may be practiced without these specific details. In other instances, well-known methods, procedures and components have not been described in detail so as not to obscure the subject matter described herein. The description is not to be considered as limiting the scope of the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices can be directly connected to one another or connected to one another through one or more intermediate elements or devices via an electrical element, electrical signal, or a mechanical element depending on the particular context. Furthermore, the term "communicative coupling" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

Described herein are systems, methods and computer program product for protecting deep neural network image classifiers. The systems, methods, and devices can use watermark bits embedded into images to detect whether a received image has been adversely modified. adversely modified images can be prevented from being provided as inputs to the deep neural network.

The systems, methods, and devices described herein may be implemented as a combination of hardware or software. In some cases, the systems, methods, and devices described herein may be implemented, at least in part, by using one or more computer programs, executing on one or more programmable devices including at least one processing element, and a data storage element (including volatile and non-volatile memory and/or storage elements). These devices may also have at least one input device (e.g. a pushbutton keyboard, mouse, a touchscreen, and the like), and at least one output device (e.g. a display screen, a printer, a wireless radio, and the like) depending on the nature of the device.

Some elements that are used to implement at least part of the systems, methods, and devices described herein may be implemented via software that is written in a high-level procedural language such as object oriented programming. Accordingly, the program code may be written in any suitable programming language such as Python or C for example. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

The present disclosure relates to a system, method, and computer program product for protecting deep learning-based models used for image classification. Although deep learning-based models have achieved tremendous success in image-related tasks, they are known to be vulnerable to adversarial examples—inputs with imperceptible, but subtly crafted perturbation which fool the models to produce incorrect outputs.

Various different types of adversarial attack methods have been developed to generate adversarial examples for inputs to deep-learning based models. Two main categories of adversarial attacks are gradient-based attacks and optimization-based attacks.

For gradient-based attacks, adversarial perturbations are typically constructed based on the gradients of the target DNN with respect to the original image x. Examples of gradient-based attacks include Fast-Gradient Sign Method (FGSM) (see Goodfellow, Ian J., Jonathon Shlens, and Christian Szegedy. "Explaining and harnessing adversarial examples." arXiv preprint arXiv:1412.6572 (2014)) and Projected Gradient Descent (PGD) (see Madry, Aleksander, et al. "Towards deep learning models resistant to adversarial attacks." arXiv preprint arXiv:1706.06083 (2017)). PGD takes advantage of iteratively running FGSM with smaller step sizes, resulting in a stronger attack at the cost of heavier computation. Both FGSM and PGD have been shown to yield a near 100% success rate with a sufficiently large perturbation budget.

Optimization-based methods focus on optimizing an objective function, such as minimizing the perturbation and maximizing the confidence of adversarial example. Two well-known examples are Carlini & Wagner (CW) attack (see Carlini, Nicholas, and David Wagner. "Towards evaluating the robustness of neural networks." 2017 ieee symposium on security and privacy (sp). IEEE, 2017) and Deep-Fool (see Villalba-Diez, Javier, et al. "Deep learning for industrial computer vision quality control in the printing industry 4.0." Sensors 19.18 (2019): 3987). These attacks usually introduce smaller perturbations to the image x compared with gradient-based attacks.

The performance of an adversarial attack can depend on the level of knowledge of the adversary. The adversary's level of knowledge is often categorized into one of three different threat categories: 1. a black-box adversary; 2. a static white-box adversary; and 3. an adaptive white-box adversary.

A black-box adversary is considered to have no knowledge of either the DNN to be safeguarded or the defense strategy. As such, the choice of attack is limited to a few approaches such as transfer attacks (see Papernot, Nicolas, et al. "Practical black-box attacks against machine learning." Proceedings of the 2017 ACM on Asia conference on computer and communications security. 2017) or query-based attacks (see Alzantot, Moustafa, et al. "Genattack: Practical black-box attacks with gradient-free optimization." Proceedings of the Genetic and Evolutionary Computation Conference. 2019).

A static white-box adversary is considered to have full knowledge of the DNN to be secured (including its architecture and parameters) but no knowledge of the defense strategy. Adversarial examples from a static white-box adversary for an image x are typically generated based on the DNN to be secured, the image x, a targeted output, and the allowed maximum perturbation distance from x.

An adaptive white-box adversary is considered to have full knowledge of both the DNN to be secured (including its architecture and parameters) and the defense strategy. Adversarial examples from an adaptive white-box adversary are capable of generating the strongest adversarial examples to defeat the defense strategy and cause the DNN to produce incorrect outputs.

The present disclosure provides a watermarking-based framework that can distinguish adversarial examples from benign images. This framework can be used to protect deep image classifiers against adversarial attacks. In particular, the watermarking-based framework can be used to identify images that have been adversely modified during transmission through a potentially adversarial environment. Adversely modified images can be prevented from being provided as inputs to the deep image classifier.

A watermark encoder can be used to embed a watermark into an original image. The original image can be watermarked using a secret key. The watermarked image can then be transmitted through a possibly adversarial environment. The watermarked image can be possibly attacked by adversaries when passing through the possibly adversarial environment. The watermarked and possibly attacked image can be accepted by a detector only if the embedded watermark bits are recovered with high precision.

The detector can be paired with the deep image classifier. The detector can receive an image intended for the deep image classifier from the possibly adversarial environment. The detector can then evaluate the received image to determine whether it has been adversely modified during transmission through the possibly adversarial environment. The evaluation of the received image can include determining whether the received image includes an expected watermark corresponding to the watermark embedded into the original image.

If the evaluation of the received image indicates that the image has been adversely modified (e.g. the received image does not include the expected watermark), then the received image is prevented from being provided to the deep image classifier. If the evaluation of the received image indicates that the image has not been modified (e.g. the received image includes the expected watermark), then the received image can be provided to the deep image classifier.

The present disclosure describes an example implementation of the systems, methods and computer program products for use with digital images stored using a JPEG format. Although examples are described herein in the context of images in a JPEG format, it should be understood that such examples can also be applied to images in any image format. Original images (in any format) can be converted into a DCT domain in a block-by-block manner. In some cases, received images may be converted into a pixel domain prior to conversion to the DCT domain. For example, original images (of any format) that are received in a compressed format can be decompressed into the pixel domain prior to conversion to the DCT domain.

JPEG is one of the most commonly-used formats for compressing images and as such is used in many applications of deep image classifiers. A brief overview of the key steps of JPEG compression is provided below for reference.

JPEG compression begins with a color space conversion. A given image is first converted from an RGB color space to YCbCr color space. In the YCbCr color space, Y represents the luminance (pixel brightness) channel and Cb and Cr represent the chrominance (pixel color) channels.

Block-wise discrete cosine transforms (DCT) are then performed on the converted image. For each channel (Y, Cb, and Cr), the image is divided into non-overlapping 8×8 blocks. For each block, the pixel values of the block are decomposed into 64 frequency components (DCT coefficients) using a discrete cosine transform (DCT).

DCT coefficients are typically scanned in zigzag order. In the discussion that follows, for each $i \in \{0, 1, \ldots 63\}$, $d(i)$ will denote the DCT coefficient at the ith frequency in the zigzag order. In this context, a lower index value for i represents a lower frequency.

Following the block-wise discrete cosine transforms, the DCT coefficients are quantized. Each DCT coefficient can be quantized to an integer multiple of a corresponding quantization step size as follows:

$$D_{QF}(i) = \left\lfloor \frac{d(i)}{Q_{QF}(i)} \right\rceil, \quad (1)$$

where $D_{QF}(i)$ is the ith quantized DCT coefficient integer, $[\bullet]$ denotes a rounding function which returns the nearest integer, $Q_{QF}(i)$ is the quantization step size with respect to a certain JPEG quality factor (QF ranges from 1 to 100), and the quantized DCT coefficient is equal to $D_{QF}(i)Q_{QF}(i)$.

A smaller QF corresponds to higher quantization step sizes which results in worse image quality. Alternative quantization step sizes other than $Q_{QF}(i)$ can also be used in implementations of Eq. (1).

In the systems, methods and computer program products described herein, an original image can be watermarked prior to transmission through a potentially adversarial environment. The original image can be watermarked by embedding watermark bits into the original image. The watermark bits can be embedded at the time of acquisition. This may ensure that the watermarked image generally corresponds to the original image with the exception of the watermark bits.

The watermark bits can be embedded in a secure and confidential manner using a secret key. This secret key can be shared between the encoder and a corresponding detector used to protect a deep image classifier. The secret key can be shared using various known techniques for securely exchanging encryption keys (e.g. using known key exchange methods).

The watermarked image can then be transmitted through a potentially adversarial environment where it may encounter adversarial attacks. For instance, the watermarked image may be transmitted from the image acquisition device to a processor configured to implement an image classification system that includes a deep image classifier. The watermarked image may be transmitted using a communication interface such as a wired or wireless network which may be comprised by possible adversarial attacks.

The deep image classifier can be paired with a detector that receives images from the potentially adversarial environment. The detector can be configured to receive or intercept images before they are provided to the deep image classifier. The detector can be configured to determine whether a received image is a benign image before allowing the received image to be provided as an input to the deep image classifier. If the detector determines that the received image is adversely modified, then the received image can be rejected (i.e. prevented from being provided as an input to the deep image classifier) as an adversarial example.

The detector can evaluate a received image to determine if an expected watermark is present and unmodified. That is, the detector can identify expected watermark bit locations in the received image. The expected watermark bit locations may be identified using a secret key exchanged with the encoder. The detector can then compare the potentially watermarked bits at the expected watermark bit locations with expected watermark bits determined using the secret key. If the potentially watermarked bits in the received image match the expected watermark bits determined from the secret key, then the detector can identify the received image as being benign. If the potentially watermarked bits in the received image do not match the expected watermark bits determined from the secret key, then the detector can identify the received image as being adversely modified.

The systems, methods and computer program products described herein can be applied to protect any image task related DNN. Example applications include, but are not limited to, quality control cameras in manufacturing (see, for example, Ozdemir, Ridvan, and Mehmet Koc. "A Quality Control Application on a Smart Factory Prototype Using Deep Learning Methods." 2019 IEEE 14th International Conference on Computer Sciences and Information Technologies (CSIT). Vol. 1. IEEE, 2019; and Villalba-Diez, Javier, et al. "Deep learning for industrial computer vision quality control in the printing industry 4.0." Sensors 19.18 (2019): 3987,) autonomous vehicles, facial recognition applications and so forth. For many applications, the original benign image can be watermarked before it is attacked. For example, watermark bits can be embedded to the original image at the time of acquisition e.g. by integrating an encoder into the image acquisition device.

Referring now to FIG. 1, shown therein is a block diagram illustrating an example image classification system 100. The image classification can be configured to identify and classify received images using a deep neural network image classifier 108. The example system 100 can be configured to prevent perturbed images from being provided as inputs to the deep neural network image classifier 108. This may ensure that the image-related tasks performed by the image classifier 108 are not affected by adversarial examples.

In the example illustrated, system 100 includes an image acquisition device 102, an encoder 104, a detector 106, and deep neural network image classifier 108. The encoder 104 can be configured to communicate with the detector 106 through a potentially adversarial environment 110. The encoder 104 and detector 106 can cooperate to prevent adversarial examples from being provided as inputs to the image classifier 108.

The image acquisition device 102 can include various different devices configured to acquire image data, such as cameras and visual sensors. The image acquisition device 102 may include devices configured to acquire image data for various different applications, such as image and video cameras used in facial recognition, quality control cameras used in manufacturing processes, cameras and other sensors in self-driving vehicles and so forth. The image acquisition device 102 can be configured to acquire an original image, denoted herein as x.

The image acquisition device 102 may include a processor configured to perform initial signal processing of received image data. In such cases, the processor on the image acquisition device 102 may be configured to process received image data in order to acquire an original image.

The encoder 104 can be communicatively coupled to the image acquisition device 102. The encoder 104 generally refers to any processing unit capable of receiving an original image from the image acquisition device 102 and generating a watermarked image corresponding to the original image.

As explained in further detail below, the encoder 104 can be configured to generate the watermarked image by embedding a plurality of watermark bits into the original image.

The encoder 104 can be implemented using a processor such as a general purpose microprocessor. The processor controls the operation of the encoder 104 and in general can be any suitable processor such as a microprocessor, controller, digital signal processor, field programmable gate array, application specific integrated circuit, microcontroller, or other suitable computer processor that can provide sufficient processing power processor depending on the desired configuration, purposes and requirements of the system 100.

The encoder 104 can include the processor, a power supply, memory, a signal acquisition unit operatively coupled to the processor and to the image acquisition device 102, and a communication module operatively coupled to the processor. The memory unit can include RAM, ROM, one or more hard drives, one or more flash drives or some other suitable data storage elements such as disk drives, etc.

Optionally, the encoder 104 can be coupled directly to the image acquisition device 102. For example, the image acquisition device 102 may be coupled to the communication module (and thereby the encoder 104) using a wired connection such as Universal Serial Bus (USB) or other port.

Although shown separately, the encoder 104 may be integrated into, or combined with, the image acquisition device 102. For example, the image acquisition device 102 may include a processor configured to perform initial signal processing and/or the encodering functions of the encoder 104. This may ensure that images acquired by the image acquisition device can be encoded by encoder 104 prior to any potential adversarial attacks.

The encoder 104 can be communicatively coupled to one or more detectors 106, e.g. using a wired or wireless communication module (e.g., Bluetooth, Bluetooth Low-Energy, WiFi, ANT+IEEE 802.11, etc.). The encoder 104 can also be communicatively coupled to a detector 106 over, for example, a wide area network such as the Internet.

The encoder 104 can be configured to ensure that the original image x is not directly exposed to an adversarial environment. Rather, the encoder 104 (represented herein as $\phi$) can be configured to convert x into $x_{wm}$, where $x_{wm}$ represents a watermarked version of x. The encoder can be configured to convert x into $x_{wm}=\phi(x,S)$ by embedding watermark bits into x using a secret key, where S denotes both the secret key and embedded watermark bits. S can be maintained as a secret that is unavailable to an adversary generating an adversarial example in the potentially adversarial environment 110. However, S can be shared with the detector 106 through a key exchange process to enable detector 106 to determine whether a received image corresponds to a benign watermarked original image.

The communication module can be configured to transmit the watermarked image $x_{wm}$ to a deep image classifier 108. The transmission can include the watermarked image $x_{wm}$ passing through an adversarial environment 110. The watermarked image $x_{wm}$ may be modified prior to reaching the detector 106, due to adversarial attacks in the adversarial environment 110 or some allowed legal operation (e.g. recompression) before being received by the detector 106. Accordingly, the detector 106 can receive a potentially perturbed image that may be represented as $x_{wm}$, $\varphi(x_{wm})$, or $g(x_{wm})$ where $\varphi$ denotes an adversarial attack algorithm and g denotes an allowed legal operation.

The detector 106 can be configured to determine whether a potentially perturbed image received from the environment 110 corresponds to an adversely perturbed image (i.e. an attacked image $\varphi(x_{wm})$) or a benign image (e.g. a watermarked image $x_{wm}$ or legally modified image $g(x_{wm})$). The detector 106 can evaluate the potentially perturbed image received from the environment 110 (using S determined through a key exchange with the encoder 104) prior to allowing the received image to be provided as an input to the image classifier 108. The detector 106 can be configured to provide the received potentially perturbed image as an input to the deep image classifier $\mathcal{C}$ only if it is determined to be a benign image.

The detector 106 can be implemented using a processor such as a general purpose microprocessor. The processor controls the operation of the detector 106 and in general can be any suitable processor such as a microprocessor, controller, digital signal processor, field programmable gate array, application specific integrated circuit, microcontroller, or other suitable computer processor that can provide sufficient processing power processor depending on the desired configuration, purposes and requirements of the system 100.

The detector 106 can include the processor, a power supply, memory, and a communication module operatively coupled to the processor and to the image classifier 108. The memory can include RAM, ROM, one or more hard drives, one or more flash drives or some other suitable data storage elements such as disk drives, etc.

The image classifier 108 can be an image classification system that operates using a deep neural network model trained to perform a particular image classification application. The image classifier can be implemented using any suitable processor such as a microprocessor, controller, digital signal processor, field programmable gate array, application specific integrated circuit, microcontroller, or other suitable computer processor that can provide sufficient processing power processor depending on the desired configuration, purposes and requirements of the system 100.

The trained neural network model may be stored in non-transitory memory accessible to the processor of the image classifier 108. The particular parameters and training of the deep neural network model can vary depending on the particular application for which the image classifier 108 is implemented.

For example, the image classifier 108 can be trained to perform image classification of JPEG images. The JPEG standard is one of the most commonly-used formats for images and as a result is also widely adopted in computer vision datasets and pipelines, e.g., the ImageNet dataset (see for example Deng, Jia, et al. "Imagenet: A large-scale hierarchical image database." 2009 IEEE conference on computer vision and pattern recognition. Ieee, 2009). In implementations of the present disclosure involving JPEG images, certain common operations performed during JPEG compression can be considered legal modifications to original images (i.e. modifications that are not considered adverse).

For example, high quality JPEG compression is often acceptable or even required in practical applications. Accordingly, JPEG re-compression with a QF≥50 can be considered a legal operation g. Thus, the encoder 104 and detector 106 can be configured such that watermarked images subject to JPEG re-compression with a QF≥50 can still be identified as benign images. More generally, the encoder 104 and detector 106 can be configured to ensure that benign images are readily distinguished from adversely modified images without negatively impacting the original image intended as an input to the deep image classifier 108.

Accordingly, the encoder 104 and detector 106 can be defined to operate in accordance with a plurality of performance metrics.

The classification accuracy of a watermarked image $x_{wm}$ can be identified as a performance metric. The watermarking performed by the encoder 104 can be defined to not significantly degrade the classification accuracy of the deep image classifier $\mathcal{C}$. The encoder 104 can be configured to ensure that the watermark bits embedded into the original image do not significantly degrade the performance of the deep image classifier $\mathcal{C}$. As discussed further below, the performance degradation of the deep image classifier $\mathcal{C}$ can be evaluated by comparing the Top-1 and Top-5 accuracy of an original image dataset and a watermarked image dataset.

The watermarking distortion of a watermarked image $x_{wm}$ can be identified as a performance metric. The encoder 104 can be configured to ensure that the watermark bits embedded into an original image do not distort significantly the original image x. As discussed further below, the watermarking distortion can be evaluated using the peak signal-to-noise ratio (PSNR) between the original image x and the watermarked $x_{wm}$.

Furthermore, the encoder 104 and detector 106 can be configured to ensure that the images accepted by the detector 106 (i.e. images identified as being benign) are harmless to $\mathcal{C}$. Accordingly, the detection rate of the detector 106 (and the overall watermarking framework) can be identified as a performance metric. The detection rate can be defined as the percentage of adversely modified images $\varphi(x_{wm})$ that are accepted by the detector as benign images. The detection rate can provide an indication of the sensitivity of the detector 106 (and the overall watermarking framework) to adversarial attacks.

Accordingly, the effective false negative rate of the detector 106 (and the overall watermarking framework) can be identified as a performance metric. The effective false negative rate can be defined as the percentage of adversely modified images $\varphi(x_{wm})$ that are simultaneously accepted by the detector and also successfully cause the DNN C to produce outputs different from those corresponding to $x_{wm}$. The effective false negative rate reflects the level of harmful adversarial examples that are able to bypass the detector 106. An adversary may occasionally bypass the detector 106 by decreasing the perturbation budget (i.e. the level of perturbation applied to the attacked image). However, the strength of the resulting adversarial example will also decrease. Accordingly, if an attacked image $\varphi(x_{wm})$ and the watermarked image $x_{wm}$ generate the same prediction when provided as inputs to the image classifier $\mathcal{C}$, the attacked image $\varphi(x_{wm})$ can be considered harmless and would not be considered as an effective false negative case The encoder 104 and detector 106 can also be configured to ensure that benign images are not being rejected by the detector 106. Accordingly, the effective false positive rate of the detector 106 (and the overall watermarking framework) can be identified as a performance metric. If a watermarked image $x_{wm}$ is not adversely modified, the detector 106 should be configured to accept the watermarked image $x_{wm}$ as a benign image with high probability. The false positive rate can be defined as the percentage of $x_{wm}$ that are rejected by the detector as adversely modified images. As described in further detail herein below, the watermarking framework disclosed herein can provide a false positive rate that is guaranteed to be 0.

As noted above, the encoder 104 and detector 106 can be configured such that watermarked images subject to JPEG re-compression with a QF≥50 can still be identified as benign images. In other words, the detector 106 can be configured so that legally modified images $g(x_{wm})$ are not rejected so as to produce a false positive case. The robustness against high quality JPEG re-compression can be evaluated using the JPEG re-compression false positive rate (JRFPR), defined as the percentage of re-compressed images $g(x_{wm})$ that are rejected by the detector 106 as adversely modified images.

Figure 2A:
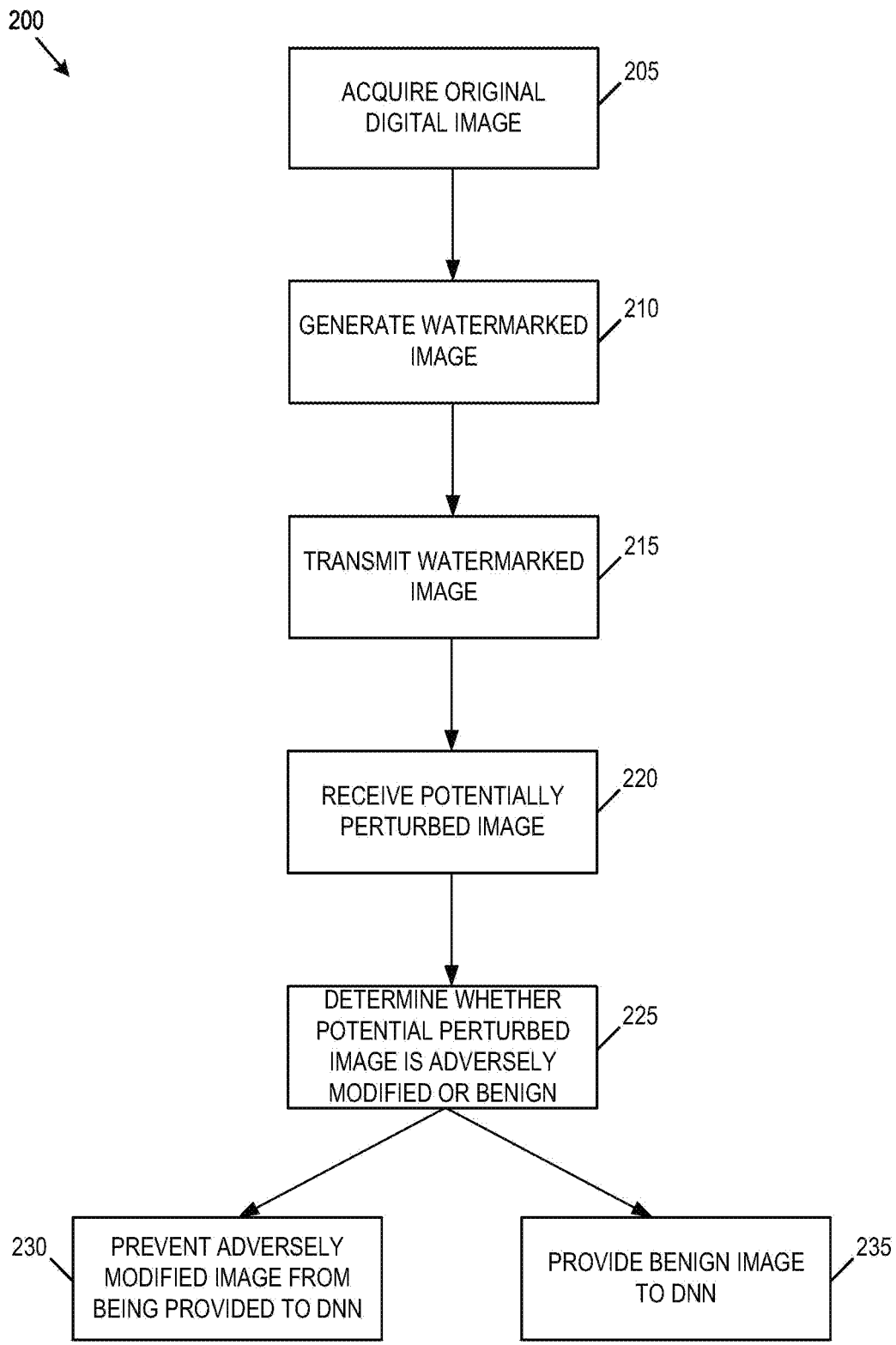
FIG. 2A is a flowchart illustrating an example of a method for protecting a deep neural network image classifier.

Referring now to FIG. 2, shown therein is an example method 200 for protecting a deep neural network image classifier. The method 200 may be used with an image classification system such as system 100 for example. Method 100 is an example of a method for protecting a deep neural network image classifier in which watermarking is used to identify images that have been modified after passing through a potentially adversarial environment.

At 205, an original digital image intended for the deep neural network image classifier can be acquired. The original digital image can be acquired using an image acquisition device such as device 102.

At 210, a watermarked image can be generated from the original digital image. The watermarked image can be generated by embedding a plurality of watermark bits into the original digital image.

The watermarked bits can be embedded at specified watermarking locations. The watermarking locations can be determined randomly for the image received at 205. For example, the watermarking locations can be determined using a secret key associated with the original digital image. The secret key can be generated or selected (e.g. by the encoder 104) for the original digital image at the time of embedding the watermark bits. The secret key may be selected or generated randomly for the original digital image received at 205.

A watermarked bit can be embedded into each specified watermarking location. In order to embed a given watermarked bit, a corresponding embedding value can be embedded at each specified watermarking location. The embedding value can represent, in effect, an encoded version of the corresponding watermark bit. The embedding value can be determined using the corresponding watermark bit from the plurality of watermark bits and a reference bit.

The reference bit can also be embedded into the watermarked image. The reference bit can be embedded at a specified reference location. The reference location can also be determined randomly for the original digital image, e.g. using the secret key.

An example process 250 for embedding a plurality of watermark bits into an original digital image received in a JPEG format is described herein below with reference to FIG. 2B At 215, the watermarked image from 210 can be transmitted through a potentially adversarial environment. The watermarked image can be transmitted to a deep image classifier 108 through a communication network that can include a potentially adversarial environment 110.

At 220, a potentially perturbed image can be received from the potentially adversarial environment 110. The potentially perturbed image may be received as being intended for the deep neural network image classifier 108. For example, the potentially perturbed image can be received by a detector such as detector 106. The detector 106 may be configured to receive (or intercept) all of the images transmitted to the deep neural network image classifier 108 prior to those images being provided as inputs to the deep neural network image classifier 108.

At 225, the detector 106 can determine whether the potentially perturbed image is an adversely modified image or a benign image. The detector 106 can determine whether the potentially perturbed image is an adversely modified or benign image by determining whether the potentially perturbed image includes an expected watermark.

An example process 300 for determining whether the potentially perturbed image includes a plurality of potentially watermarked bits matching the plurality of watermark bits embedded into the original digital image is described in further detail herein below with reference to FIG. 3A.

The expected watermark can be defined to include a plurality of expected watermark bits. Each expected watermark bit can have an associated expected watermark location and expected watermark value. Determining whether a potentially perturbed image includes the expected watermark can involve comparing potentially watermarked bits extracted from the expected watermark locations in the potentially perturbed image against the expected watermark values for those expected watermark locations.

The detector 106 can evaluate the received image to determine whether the potentially perturbed image includes a plurality of embedded bits (i.e. potentially watermarked bits) matching the plurality of expected watermark bits (i.e. the watermark bits embedded into the original digital image at 210).

The potentially perturbed image can be identified as a benign image when the potentially perturbed image includes the plurality of embedded bits matching the plurality of expected watermark bits. Otherwise, the potentially perturbed image can be determined to be an adversely modified image (i.e. because the potentially perturbed image did not include a plurality of embedded bits matching the plurality of expected watermark bits).

The plurality of embedded bits can be identified at expected watermarked locations in the potentially perturbed image. The expected watermarked locations can be determined using a secret key associated with the original image. As noted herein above, the detector 106 can determine the secret key through a key exchange with the encoder 104. The expected watermarked locations can then be determined by the detector 106 in generally the same manner as the watermark locations at 210.

Determining that the potentially perturbed image includes the plurality of embedded bits matching the plurality of expected watermark bits may allow for a minimal level of error between the expected watermark bits and the embedded bits.

For example, a bit error rate can be determined based on comparing the embedded bits with the expected watermark bits. The bit error rate can be defined to represent a percentage of the embedded bits that are distorted with respect to the corresponding expected watermark bits. The potentially perturbed image can be determined to include the plurality of embedded bits matching the plurality of expected watermark bits when the bit error rate is less than an error rate threshold. For example, the error rate threshold may be in the range of 0-2%. The error rate threshold may be set to be at most 1%. Alternatively, the error rate threshold may be set to be at most 0.05%.

The error threshold rate may vary depending on the application. For instance, a higher error threshold rate may be used in applications where a greater level of image distortion may be expected in practice. The particular error rate threshold for a given application may be determined empirically based on the requirements of that application.

In response to determining that the potentially perturbed image is an adversely modified image, method 200 can proceed to 230. At 230, the potentially perturbed image can be prevented from being provided to the deep neural network image classifier. This can help prevent adversarial examples from being analyzed by the deep image classifier.

Alternatively, in response to determining that the potentially perturbed image is a benign image, the method can then proceed to step 235. At 235, the potentially perturbed image can be provided to the deep neural network image classifier. Benign images may be expected to be benign from the perspective of the deep image classifier and can thus be analyzed without concerns of having been adversely modified.

Figure 2B:
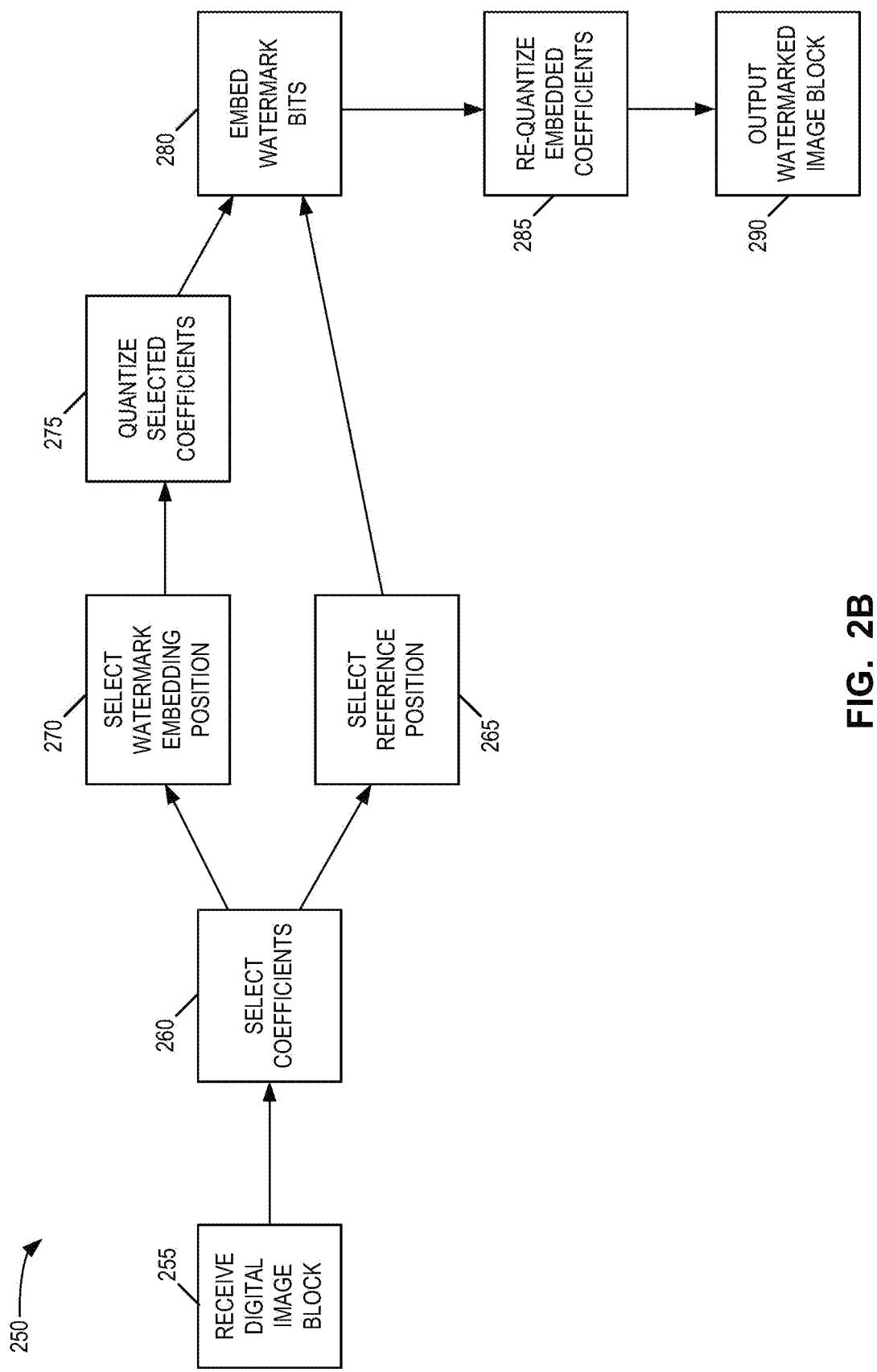
FIG. 2B is a flowchart illustrating an example of a method for generating a watermarked image.

Referring now to FIG. 2B, shown therein is an example method 250 for generating a watermarked image. The method 250 may be used with an image classification system such as system 100 for example.

Method 250 is an example process for generating a watermarked image by embedding watermark bits into selected DCT coefficients of an original image. Although method 250 is described using the example of an original image in a JPEG format, it should be understood that method 250 can also be applied to images in other image formats. These original images can be converted into the DCT domain in a block by block manner. In some cases, received images may be converted into the pixel domain prior to conversion to the DCT domain. For example, original images (of any format) that are received in a compressed format can be decompressed into the pixel domain prior to conversion to the DCT domain.

This process can rely on an invariant property of DCT coefficients, described herein as Lemma 1 (see Lin, Ching-Yung, and Shih-Fu Chang. "A robust image authentication method distinguishing JPEG compression from malicious manipulation." IEEE Transactions on Circuits and Systems for Video Technology 11.2 (2001): 153-168 [Theorem 1]):

Lemma 1 (DCT Invariant Property) Let d be a DCT coefficient. If d is an integer multiple of $q_0$, then for any quantization step size $q<q_0$, quantizing d with q is invertible. That is, d can be fully reconstructed from its quantized value $$\left\lfloor \frac{d}{q} \right\rfloor q.$$

At 255 a digital image block can be received. The digital image block can be an 8×8 JPEG image block determined based on an original image acquired by the image acquisition device. The 8×8 JPEG image block can correspond to a specified channel (e.g. Y, Cb, or Cr) of the YCbCr color space determined for the corresponding image. For example, the digital image block may be an 8×8 image block from the luminance channel.

Although the present disclosure is described in the context of an 8×8 image block, it should be understood that other sizes of image blocks can be used in implementations of the present disclosure. For example, a digital image block may include an arrangement with block sizes other than 8×8. A digital image block may even include multiple 8×8 sub-blocks combined into a single digital image block (e.g. a combination of four 8×8 image blocks) received at 255.

A plurality of digital image blocks can be identified in the original digital image. Method 200 can be repeated for each digital image block in order to embed a plurality of watermark bits into the original digital image. That is, a plurality of block specific watermark bits can be embedded into each digital image block. For example, to do so, steps 255-285 can be repeated for each 8×8 JPEG block from the original digital images.

At 260, a plurality of embedding coefficients can be identified for the digital image block from 255. The embedding coefficients can be randomly selected for the digital image block. This may help prevent adversaries from easily identifying and avoiding the embedding locations when introducing perturbations. As will be discussed in further detail below, the embedding coefficients can include a plurality of watermark embedding coefficients and at least one reference embedding coefficient.

The embedding coefficients can be determined using a secret key associated with the digital image block. The secret key can be exchanged between the encoder used to embed the watermark bits and a detector used to determine whether the image has been modified. This can allow the detector to evaluate whether the watermark is present in an image received from a potentially adverse environment.

The embedding coefficients may be selected to provide an increased likelihood of detecting perturbations resulting from an adversarial attack. Adversarial attacks often introduce different amounts of perturbation to different frequency components of an image. Perturbations tend to be found more often in low frequency bands than in high frequency bands, at least for JPEG images contained in the ImageNet dataset (see, for example, Sharma, Yash, Gavin Weiguang Ding, and Marcus Brubaker. "On the effectiveness of low frequency perturbations." arXiv preprint arXiv:1903.00073 (2019); and Tsuzuku, Yusuke, and Issei Sato. "On the structural sensitivity of deep convolutional networks to the directions of fourier basis functions." Proceedings of the IEEE/CVF Conference on Computer Vision and Pattern Recognition. 2019).

Embedding watermark bits into DCT coefficients at low frequencies can provide an increased likelihood that large perturbations at low frequencies will destroy watermark bits embedded therein once the watermarked image is attacked. Accordingly, the plurality of embedding coefficients may be identified as low-frequency coefficients in the digital image block.

The inventors performed a coefficient-wise perturbation analysis for 100,000 JPEG blocks in the Luminance channel with respect to FGSM with $\epsilon$=8. The values of additive adversarial perturbation were collected in 64 DCT coefficients of these JPEG blocks.

Figure 4A:
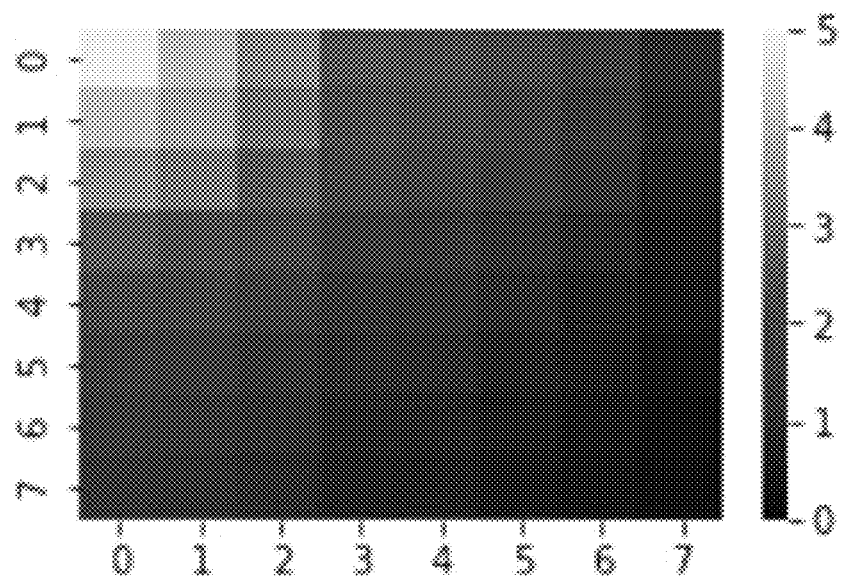
FIG. 4A is a diagram illustrating a plot of the standard deviation of adversarial perturbations per DCT coefficients from an analysis of 8×8 JPEG blocks subject to an adversarial attack.

FIG. 4A shows the standard derivation of perturbations per DCT coefficient from the 100,000 JPEG blocks analyzed. As can be seen from FIG. 4A, the perturbation energy introduced by FGSM was largely concentrated on low DCT frequencies, particularly the first 16 DCT coefficients in zigzag order.

Figure 4B:
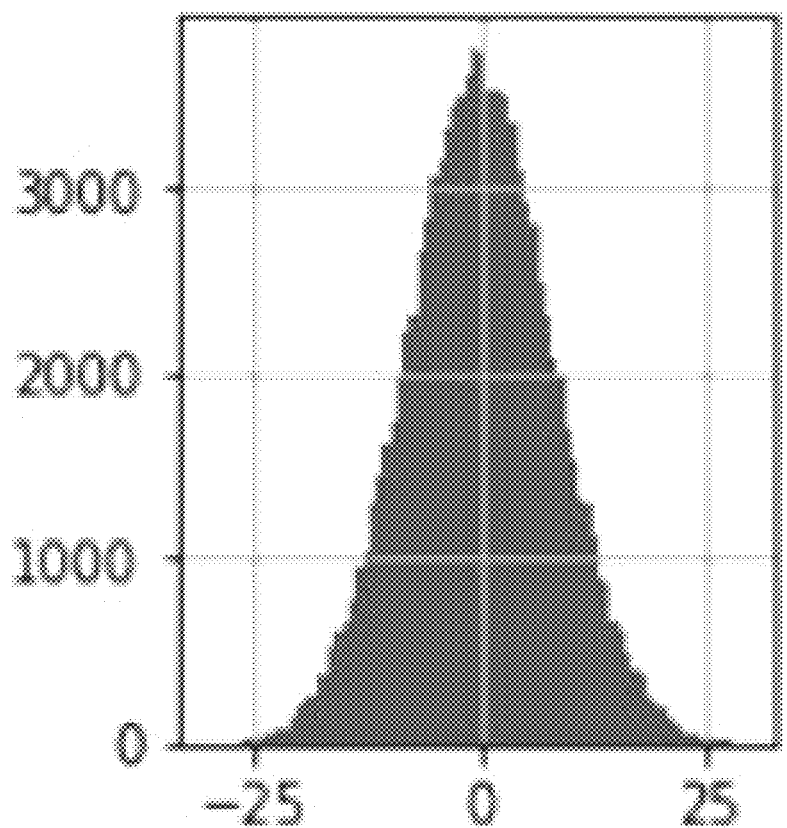
FIG. 4B is a diagram illustrating a plot of the distribution of perturbations from the DCT coefficient in the top-left corner of the plot shown in FIG. 4A.

FIG. 4B shows the distribution of perturbations at DC (the DCT coefficient in the top-left corner of the plot shown in FIG. 4A), which is more or less a zero-centered Gaussian distribution. As can be seen from FIG. 4B, the mean value of perturbations per DCT coefficient is approximately zero.

As shown in FIGS. 4A and 4B, perturbations were found with greater frequency in the first 16 DCT coefficients of the JPEG image blocks analyzed. Accordingly, the first 16 possible coefficients of an 8×8 JPEG image block in zigzag order can be identified as possible embedding coefficients. The plurality of embedding coefficients can then be selected from these possible embedding coefficients.

The plurality of embedding coefficients can be randomly selected from the 16 possible embedding coefficients. The secret key associated with the digital image block can be used to select the plurality of embedding coefficients.

For example, 5 DCT coefficients from 16 possible embedding positions can be selected as the plurality of watermark embedding coefficients. The secret key can then be defined with a key length of $[\log_2(_5{}^{16})]$ for each image block. This key can be the secret key associated with the digital image block. As noted above, the secret key can be determined for each digital image block of a given image.

The number of embedding coefficients and/or possible embedding coefficients can also vary depending on the particular implementation. For example, the number of embedding coefficients and/or possible embedding coefficients may be selected empirically based on the requirements of a given application.

The number of embedding coefficients and/or possible embedding coefficients can also vary depending on the size of the image block used. For example, a larger number of embedding coefficients and possible embedding coefficients may be selected in cases where a larger size of image block is used.

At 265, a reference bit can be determined based on the plurality of embedding coefficients determined at 260. The plurality of embedding coefficients from 260 can include a reference embedding coefficient.

For example, the reference embedding coefficient may be selected as one of the DCT coefficients identified 260 using the secret key. The reference embedding coefficient can be identified as a specified coefficient from the plurality of DCT coefficients identified 260 (e.g. the first DCT coefficient in the plurality of DCT coefficients identified 260). This reference embedding coefficient can then be used along with a special reference switch bit to embed the reference bit. The reference switch bit can be determined, for example, from the secret key.

A reference coefficient can be defined as the reference embedding coefficient having the reference bit embedded therein. A quantized reference embedding coefficient can be generated by quantizing the reference embedding coefficient. The reference coefficient can then be generated by embedding the reference bit into the quantized reference embedding coefficient.

The reference bit can be identified as a specified reference bit of the quantized reference embedding coefficient. The specified reference bit may be identified based on the value of the special reference switch bit. For example, the specified reference bit r may be identified as the second or third last bit of the quantized coefficient integer, depending on whether the special reference switch bit s is 0 or 1.

Let d(j) represent the selected reference DCT coefficient. The reference bit r for a given image block can be determined by quantizing the selected reference DCT coefficient d(j) with the quantization step size $Q_{50}(j)$. The reference bit r can then be selected to be a specified bit (e.g. the second or third last bit) of the quantized coefficient integer, depending on whether the special reference switch bit s is 0 or 1. That is, the reference bit r can be defined according to $$r = \left\lfloor \left\lfloor \frac{d(j)}{Q_{50}(j)} \right\rceil / 2^{s+1} \right\rfloor \mod 2. \qquad (2)$$

At 270, the watermark embedding coefficients can be identified from the embedding coefficients determined at

260. The watermark embedding coefficients can be identified using the remaining DCT (other than the reference embedding coefficient) from the embedding coefficients determined at 260.

Where 5 embedding coefficients are identified at 260, the remaining 4 selected DCT coefficients can be used as the watermark embedding coefficients (i.e. the locations whether the watermark bits are embedded). This can provide 4 watermarking bits per block giving a secret length of S per 8×8 JPEG block of $[\log_2(_5{}^{16})]+5$.

At 275, a plurality of quantized watermark embedding coefficients can be generated by quantizing the plurality of watermark embedding coefficients from 270.

For example, the DCT coefficient at a given watermark embedding position i can be identified as d(i). That watermark embedding coefficient d(i) can be quantized using a quantization step size $Q_{50}(i)$ from a quantization table corresponding to QF=50 according to:

$$D_{50}(i) = \left\lfloor \frac{d(i)}{Q_{50}(i)} \right\rceil. \qquad (3)$$

At 280, the plurality of watermark bits can be embedded into the image block. The watermark bits can be embedded by, for each watermark embedding coefficient, embedding a corresponding embedding value into that watermark embedding coefficient.

The embedding value can be embedded into a specified bit in each watermark embedding coefficient. For example, each embedding value can be embedded into the Least Significant Bit (LSB) of the corresponding quantized watermark embedding coefficient (i.e. after the watermark embedding coefficient is quantized at 275).

The watermark bits may be embedded directly as the embedding value into the watermark embedding coefficient. However, this may allow an adversary to avoid detection by maintain the bit value at all of the potential watermarking locations. Accordingly, the embedding value can be defined as an encoded version of the corresponding watermark bit.

Embedding an encoded embedding value E rather than the watermark bit w directly can prevent an adversary from directly accessing the watermark bits through the embedding position of the corresponding coefficient (e.g. the LSB of $D_{50}{}^{wm}(i)$). If the watermark bit is embedded directly, even without knowledge of the selected watermark embedding positions an adversary can iterate over all possible embedding positions and keep the corresponding watermark bits consistent with the watermarked image so as to bypass the detector 106 without significantly deviating from desired adversarial examples.

An encoded embedding value can be defined for each watermark bit using the reference bit and the corresponding watermark bit. The embedding value can be generated by differentially encoding the corresponding watermark bit with respect to the reference bit.

For example, an embedding value E can be generated for a watermark bit w to be embedded into the embedding position i by differentially encoding w with respect to the reference bit. For example, each embedding value can be determined as a bitwise XOR of the reference bit and the corresponding watermark bit. That is, the embedding value E for a given watermark bit w can be determined according to $$E = r \oplus w. \qquad (4)$$

The embedding value can then be embedded into the specified bit in each watermark embedding coefficient. For example, a watermark bit w can be embedded into the position i by embedding E into the LSB of $D_{50}(i)$ according to:

$$D_{50}{}^{wm}(i) = 2[D_{50}(i)/2] + E, \qquad (5)$$

where $D_{50}{}^{wm}(i)$ is the embedded DCT coefficient integer.

At 285, a watermarked image block can be generated by re-quantizing each embedded coefficient using a quantization table associated with the digital image block. The embedded DCT coefficients can be re-quantized using the quantization table of the original image to maintain consistency in the quantization throughout the watermarked image.

An embedded coefficient can be re-quantized using the original quantization step size $D_{ori}{}^{wm}(i)$ according to:

$$D_{ori}{}^{wm}(i) = [D_{50}{}^{wm}(i) * Q_{50}(i)/Q_{ori}(i)], \qquad (6)$$

where $Q_{ori}(i)$ represents the quantization step size at position i in the quantization table of the corresponding original image. The original quantization step size $Q_{ori}(i)$ can be assumed to be strictly less than $Q_{50}(i)$, which is the case in many applications.

At 290, the watermarked image block can be output. Steps 255-290 can be repeated for each of the digital image blocks of the original digital image (e.g. all JPEG blocks in the Luminance channel). Once method 250 is complete for every digital image block, the resulting image will be the watermarked image. The watermarked image can then be transmitted to the image classifier 108 through the potentially adverse environment 110.

Figure 3A:
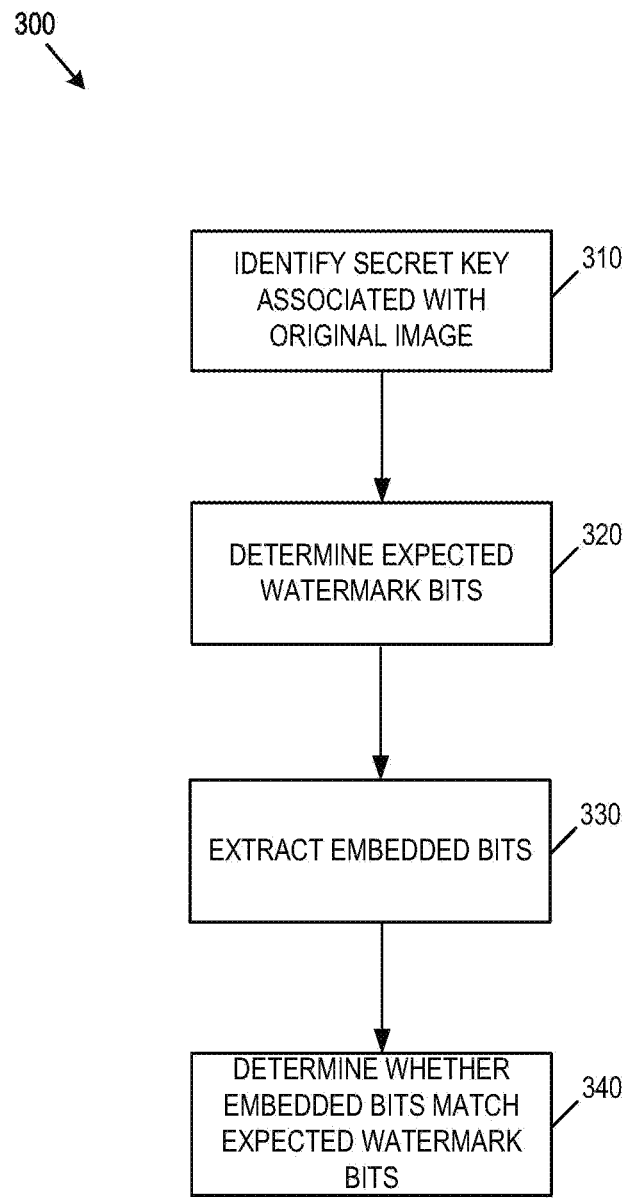
FIG. 3A is a flowchart illustrating an example of a method for detecting an adversely modified image.

Referring now to FIG. 3A, shown therein is an example method 300 for detecting a modified image. The method 300 may be used with an image classification system such as system 100 for example. Method 300 is an example of a method for detecting a modified image using watermarking that can be used to protect deep neural network image classifier.

Method 300 can be applied to an image that is intended for a deep neural network image classifier. The image can be received from a potentially adversarial environment. Accordingly, the image may potentially be perturbed (i.e. the image has the potential to have been adversely modified). Method 300 can be used to determine whether the image has been adversely modified prior to reaching the deep image classifier.

At 310, a secret key associated with the original digital image of the potentially perturbed image can be identified. For example, the secret key can be identified through a key exchange process performed between a detector implementing method 300 and an encoder that was used to embed a watermark into the original digital image.

At 320, a plurality of expected watermark bits can be determined that are associated with the secret key from 310. Each expected watermark bits can have an associated expected bit location and expected bit value.

At 330, a plurality of embedded bits (potentially watermarked bits) can be extracted from the potentially perturbed image. The embedded bits can be extracted from the expected bit locations associated with the expected watermark bits determined at 320.

At 340, it can be determined whether the plurality of embedded bits (i.e. the potentially watermarked bits) match the plurality of expected watermark bits. Whether the potentially perturbed image includes a plurality of embedded bits matching the plurality of expected watermark bits can be determined by comparing the values of the extracted embedded bits from 330 with the expected bit values of the respective expected watermark bits from the corresponding bit location.

The potentially perturbed image can be determined to be a benign image when the potentially perturbed image includes a plurality of embedded bits matching the plurality of expected watermark bits. The potentially perturbed image can be determined to be an adversely modified image when the potentially perturbed image does not include the plurality of embedded bits matching the plurality of expected watermark bits.

Optionally, the potentially perturbed image may be analyzed as a plurality of image block (e.g. a plurality of potentially perturbed image blocks). Determining whether the potentially perturbed image includes a plurality of embedded bits matching the plurality of expected watermark bits can include comparing, for each potentially perturbed image block, a plurality of block-specific embedded bits with a plurality of block-specific expected watermark bits of a corresponding original image block of the original digital image.

Figure 3B:
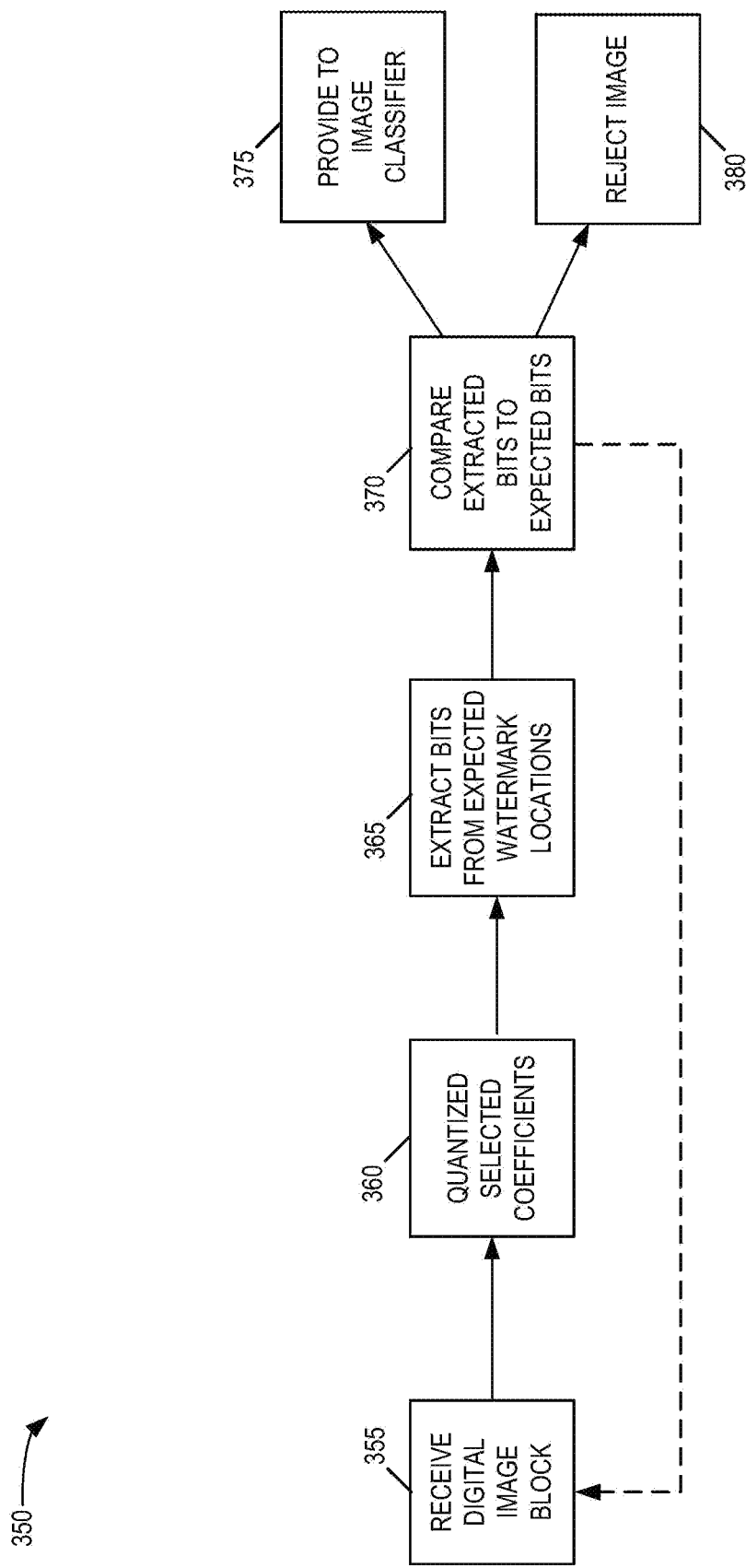
FIG. 3B is a flowchart illustrating an example of a method for preventing adversely modified images from being provided to a deep neural network image classifier.

Referring now to FIG. 3B, shown therein is an example method 350 for preventing modified images from being provided to a deep neural network image classifier. The method 350 may be used with an image classification system such as system 100 for example. Although method 350 is described using the example of an original image in a JPEG format, it should be understood that method 350 can also be applied to images in other image formats (similar to method 250 described herein above).

At 355, a digital image block can be received. The digital image block can correspond to a potentially perturbed image received from a potentially adversarial environment. Accordingly, the digital image block may correspond to a watermarked block, a watermarked and adversely modified block, or a watermarked and JPEG re-compressed block.

The digital image block may be a potentially perturbed image block from a plurality of potentially perturbed image blocks corresponding to a potentially perturbed image. Steps 355-370 of method 350 may be repeated for each potentially perturbed image block from the plurality of potentially perturbed image blocks.

At 360, a plurality of embedded coefficients of the digital image block can be quantized. The plurality of embedded coefficients can be identified in the digital image block using a secret key associated with the image block received at 355.

Each embedded coefficient can be identified as a coefficient in the digital image block that is expected to include embedded data corresponding to a watermark that was embedded into an original image. The secret key can be determined as a secret key associated with a corresponding digital image block in a watermarked image corresponding to the potentially perturbed image. The plurality of embedded coefficients can be determined using the secret key in generally the same manner as the plurality of embedding coefficients identified at 260 described herein above. The plurality of embedded coefficients can then be quantized in generally the same manner as described above in method 250.

For example, 5 selected embedding positions can be determined from the secret key. The DCT coefficients at those determined positions can then be quantized with $Q_{50}$ to compute the respective $\hat{D}_{50}(i)$, in a way similar to Eq. (3). If the received block is not adversely modified, nor re-compressed, it follows from the DCT Invariant Property that $\hat{D}_{50}(i)$ will be equal to $D_{50}^{wm}(i)$.

At 365, a plurality of potentially watermarked bits can be extracted from the plurality of embedded coefficients identified at 360.

As with the encoding process described in method 250, the plurality of embedded coefficients identified at 360 can include a plurality of potentially watermarked coefficients and at least one potential reference coefficient. The plurality of potentially watermark bits can be extracted by identifying the plurality of potentially watermarked coefficients in the plurality of embedded coefficients. A watermarked bit can then be extracted from each potentially watermarked coefficient in the plurality of watermarked coefficients.

The watermarked bit can be determined using the bit value at a specified location of the potentially watermarked coefficient. For example, the watermarked bit can be determined using the bit value of the Least Significant Bit (LSB) of the corresponding quantized watermark embedding coefficient.

As noted above, the watermarked bit may be encoded prior to being embedded. Accordingly, the watermarked bit can be extracted using a corresponding decoding process.

For each potentially watermarked coefficient, the plurality of potentially watermarked bits can be extracted using an estimated reference bit. The estimated reference bit can be determined in generally the same manner as described herein above at 265. For instance, the estimation $\hat{r}$ of the reference bit r can be determined from the reference position according to Eq. (2) with d(j) replaced by $\hat{d}(j)$.

The reference coefficient can be identified in the plurality of embedded coefficients. The reference bit location can then be determined using a reference switch value associated with the original digital image. The estimated reference bit can then be determined as the bit value at the reference bit location of the reference coefficient.

The potentially watermarked bit for a given potentially watermarked coefficient can be determined using the estimated reference bit and the bit value (an estimated embedding value) of a specified bit of that potentially watermarked coefficient. For example, the estimated embedding value for a given potentially watermarked coefficient can be determined as the least significant bit of the quantized potential watermarked coefficient $\hat{D}_{50}(i)$. For each watermarked embedding position, the LSB of $\hat{D}_{50}(i)$ can be used as the estimation $\hat{E}$ of E.

The potentially watermarked bit can be determined using a bitwise XOR of the estimated embedding value and the estimated reference bit. For example, the potentially watermarked bit $\hat{w}$ corresponding to the expected watermark bit w can be computed according to $$\hat{w} = \hat{E} \oplus \hat{r}. \tag{7}$$

At 370, the potentially watermarked bits can be compared with the expected watermarked bits. Steps 355 to 370 can be repeated for each image block associated with a potentially perturbed image received by the detector. The detector can determine whether the potentially perturbed image is adversely modified or benign based on comparing the watermarked bits with the expected watermark bits for each image block.

The detector can determine a bit error rate based on the comparison performed for all of the image blocks. The bit error rate can represent a percentage of the potentially watermark bits that were distorted with respect to the corresponding expected watermark bits. The detector can determine that the potentially perturbed image is benign when the bit error rate is less than an error rate threshold.

For all the watermark embedding positions, the extracted watermark bits can be compared with the expected watermark bits. A Bit Error Rate (BER) can be determined based on the comparison. The bit error rate may be determined as a cumulative bit error rate for all of the digital image blocks associated with a received image. The BER can represent the percentage of embedded DCT coefficients that are significantly distorted. A larger BER indicates that more distortion has been added to the watermarked image.

Various different error rate threshold may be used. For example, a BER threshold of 0.01 may be used to distinguish adversely modified images from benign images. The detector 106 can be configured to accept a received image only if the BER≤0.01 for that received image.

In response to determining that the digital image is benign, method 350 can proceed to 375. At 375 the digital image block can be provided to the deep image classifier.

In response to determining that the digital image is adversely modified, method 350 can proceed to 380. At 380, the received image is rejected (i.e. prevented from being provided to the deep image classifier as an input).

EXAMPLES

An example implementation of the methods described herein was tested. In particular, regular adversarial approaches were modified to work within the framework described herein. These modified adversaries were then used to attack the example implementation. The results of these adversarial attacks were then evaluated using various framework performance metrics.

Regular adversaries usually work with valid RGB images with fixed image size. That is, input images to a regular adversarial attack algorithm normally take integer-valued pixel intensities and also have their size equal to the input size of the classification DNN. Examples of modified adversarial approaches that can attack JPEG images with various resolutions were developed and then further extended to attack the watermark-based detection methods described herein.

The regular adversaries were modified to take JPEG images directly as their inputs. However, in the process of decoding a JPEG image into its RGB pixel intensities, real-valued pixel values were kept without any rounding. This avoids possible damage caused by rounding on watermark bits.

The adversaries were also modified to provide adversarial examples with the same size as the image to be attacked. A resizing process was integrated into the classification model as the front layer, which resizes the image to the model's input size. The adversary then directly added adversarial perturbations into the image through either gradient-based attacks or optimization-based attacks for the integrated model. The resulting adversely modified images provided adversarial examples for the integrated model, and after resizing, also adversarial examples for the original model.

Finally, the adversely modified images were JPEG compressed using the same quantization table as in the original image. This provides adversarial examples for the methods developed herein from a modified regular adversary.

Adaptive adversaries were also developed based on the watermarking-based described herein. The JPEG encoding step in a modified regular adversary may weaken its attack strength. Accordingly, a first example adaptive adversary was modified to eliminate the negative impact of JPEG encoding on attack strength. In particular, a JPEG-resistant method proposed by Shin et al. (see Shin, Richard, and Dawn Song. "Jpeg-resistant adversarial images." NIPS 2017 Workshop on Machine Learning and Computer Security. Vol. 1. 2017) was applied to strengthen modified regular adversaries including PGD, FGSM, and CW-l2, generating a first group of adaptive adversaries.

Figure 5:
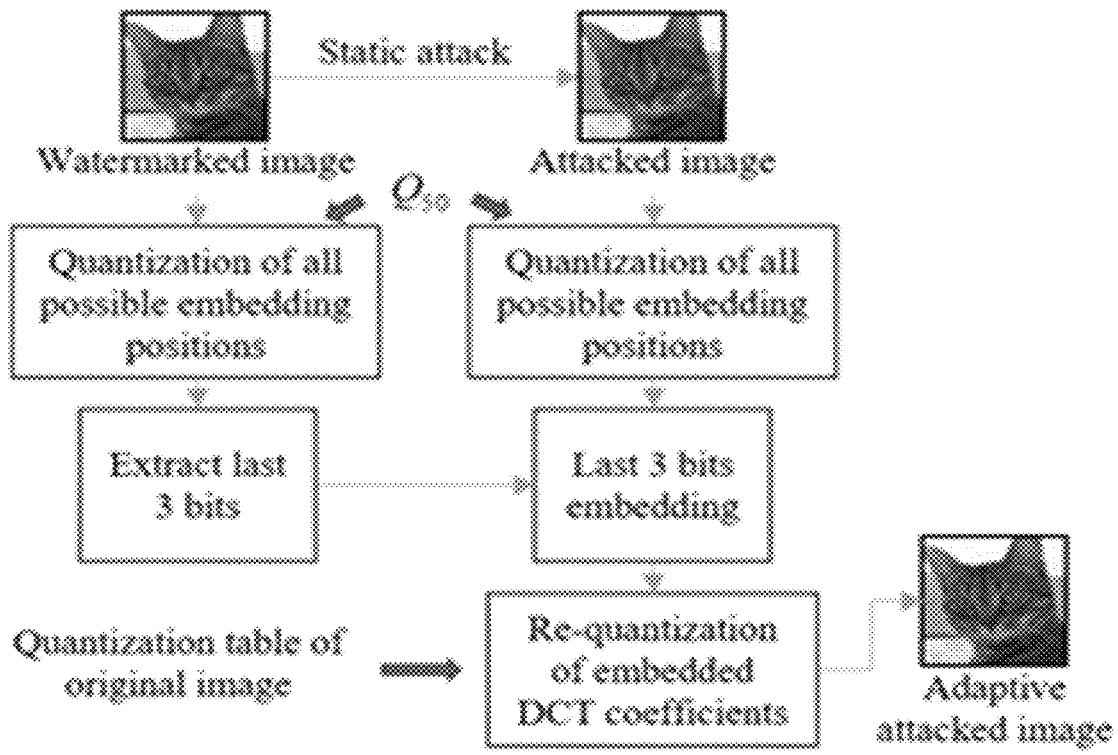
FIG. 5 is a flowchart of a modified JPEG encoding pipeline used to generate adversarial examples tested against an implementation of the methods described herein.

A second group of adaptive adversaries was developed to completely bypass the detector by taking advantage of the complete knowledge of the example watermarking and detection methods. In particular, the last JPEG encoding step in a modified regular adversary was replaced by the pipeline shown in FIG. 5. The DCT Invariant Property guarantees that after both the watermarked image and the adaptive attacked image are quantized with quantization table $Q_{50}$, the quantized DCT coefficient integer of the DCT coefficient in the adaptive attacked image and its counterpart in the watermarked image have the same last three bits at each possible embedded position. As discussed herein below, although this type of adaptive adversary can completely bypass the detector, it does not necessarily cause harm to the DNN to be secured.

The effect of the example implementation on classification accuracy and image quality was evaluated as well as its robustness to JPEG re-compression. In view of the DCT Invariant Property, the false positive rate can be guaranteed to be 0.

Table 1 shows the top-1 and top-5 accuracy before and after watermarking of a pre-trained DNNs obtained from TensorFlow (Abadi, Martin, et al. "Tensorflow: A system for large-scale machine learning." 12th USENIX symposium on operating systems design and implementation (OSDI 16). 2016), namely ResNet50V2, MobileNetV2, InceptionV3 over the entire ImageNet ILSVRC 2012 validation dataset. It took a single 4.5 GHz CPU approximately 0.3 seconds to compute (in Python) an watermarked image for the ImageNet dataset.

As shown in Table 1 below, the impact of watermarking on classification accuracy was insignificant with, on average, 0.63% and 0.49% degradation in top 1 and top 5 accuracy, respectively. The PSNR between original and watermarked images was also found to be 39.34±1.13 dB.

TABLE 1

Top-1 and Top-5 accuracy before and after watermarking for three pre-trained DNNs

| DNN | Top1 | Top1 wm | Top5 | Top5 wm |
|---|---|---|---|---|
| ResNet50V2 | 67.00% | 66.51% | 87.81% | 87.43% |
| MobileNetV2 | 70.85% | 69.63% | 89.80% | 89.01% |
| InceptionV3 | 76.85% | 76.66% | 93.30% | 93.00% |

To evaluate watermarking robustness to JPEG re-compression, watermarked images were first compressed by multiple rounds of JPEG re-compression with each QF randomly selected from [50,100), and then sent to the detector. Table 2 shows the results of the respective average BER of the detector in each case.

TABLE 2

Average BER for different rounds of JPEG re-compression.

| Rounds | 1 | 2 | 3 | 5 |
|---|---|---|---|---|
| Average BER | 0.00067 | 0.0082 | 0.021 | 0.038 |

It is clear from Table 2 that the example implementation was very robust to one or two rounds of high quality JPEG re-compression. The results in Table 2 also provide an empirical basis for selecting a BER threshold rate of about 0.01.

The effectiveness of the example implementation was then tested against a set of adversaries modified as described above. The example implementation was tested on a subset of the ImageNet ILSVRC 2012 validation dataset, which was formed by randomly choosing 1,000 images from the whole validation dataset. All selected images were classified correctly before and after watermarking by ResNet50V2 (see He, Kaiming, et al. "Identity mappings in deep residual networks." European conference on computer vision. Springer, Cham, 2016). Otherwise, a new image would be selected and tested until this condition was satisfied. The watermark distortion was found to be substantially imperceptible, and significantly less than the adversarial perturbation applied by the adversarial examples tested.

Adversarial images were produced by attacking ResNet50V2. Three representative targeted adversarial attack methods FGSM, PGD and CW-I2 were selected and modified to work within the watermarking-based framework as described above. These representative adversaries were further extended to attack our watermarking-based detection strategy (i.e., adaptive white-box attacks). These adversarial examples were implemented with the reference implementations from the CleverHans package (Papernot, Nicolas, et al. "Technical report on the cleverhans v2. 1.0 adversarial examples library." arXiv preprint arXiv:1610.00768 (2016)), which were slightly modified to accommodate the modifications described above. The targets for targeted attacks were randomly selected. The parameters selected for these attacks included:

For FGSM and PGD, the adversarial perturbations were computed subject to an $L_\infty$ constraint and the parameter $\epsilon$ controlled the magnitude of maximum perturbation per pixel. To evaluate the example implementation under different perturbation levels, targeted FGSM attacks were employed with $\epsilon=2$, 4 and 8, as well as targeted PGD attacks with $\epsilon=8$.

For CW-L2, the adversarial perturbations were optimized under an $L_2$ constraint. The hyper-parameter $\kappa$ specifies the confidence that the adversarial image is misclassified by the target DNN, and also controls the amount of perturbations.

The smaller $\kappa$, the smaller perturbations. Since small perturbations are difficult to be detected, targeted CW-I2 attacks were tested with $\kappa=0$.

Table 3 shows performance metrics resulting from static white-box FGSM and PGD attacks on the example implementation.

TABLE 3

Detection rate and effective false negative rate for static white-box FGSM and PGD attacks

| Metric | FGSM $\epsilon = 2$ | FGSM $\epsilon = 4$ | FGSM $\epsilon = 8$ | PGD $\epsilon = 8$ |
|---|---|---|---|---|
| Detection rate | 99.7% | 100.0% | 100.0% | 100.0% |
| EFNR | 0.2% | 0.0% | 0.0% | 0.0% |

Table 4 shows performance metrics resulting from adaptive white-box FGSM and PGD attacks. The first set of performance metrics was determined for the first group of modified adversaries while the second set of performance metrics was determined for the second group of modified adversaries.

TABLE 4

Detection rate and effective false negative rate for adaptive white-box FGSM and PGD attacks

| Metric | FGSM $\epsilon = 2$ | FGSM $\epsilon = 4$ | FGSM $\epsilon = 8$ | PGD $\epsilon = 8$ |
|---|---|---|---|---|
| Detection rate | 99.8% | 100.0% | 100.0% | 100.0% |
| EFNR | 0.1% | 0.0% | 0.0% | 0.0% |
| Detection rate | 0.0% | 0.0% | 0.0% | 0.0% |
| EFNR | 0.1% | 0.0% | 0.4% | 1.5% |

Table 3 and Table 4 show the detection rate and effective false negative rate in the case of static FGSM and PGD attacks, and in the case of adaptive FGSM and PGD attacks, respectively. As can be seen from Tables 3 and 4, the example detector implementation can effectively detect adversarial perturbations introduced by static and the first group of modified FGSM and PGD attacks. Although the second group of modified FGSM and PGD attacks can bypass the detector completely, they are nonetheless harmless to the subsequent classification DNN with near zero EFNR. The quantization process with $Q_{50}$ along with forcing the last three bits at each possible embedding position to be the same as those of the counterpart in the watermarked image essentially negates the impact of the adversarial perturbation.

CW-I2 attack provides strong adversarial examples with high confidence under a tight perturbation budget. The light perturbation increases the difficulty of detecting these perturbations. However, adversarial perturbations generated by CW-I2 are fragile to JPEG compression. The results for both static CW-I2 attacks and CW-I2 attacks modified according to the first group of modifications are shown in Table 5. The relatively-low detection rate of static CW-I2 attack suggests that the watermarked coefficients are barely distorted after quantization. On the other hand, converting adversarial examples to JPEG format also significantly decreases the effectiveness of the static attack, resulting in a low effective false negative rate. With the JPEG-resistant feature, the first modified CW-I2 attack yielded a higher effective false negative rate at 25.3%. However, this also increased the distortion required and resulted in a higher detection rate.

TABLE 5

Detection rate and effective false negative rate for static and adaptive white-box CW-I2 attacks

|  | Static | Type 1 | Type 2 |
|---|---|---|---|
| Detection rate | 34.1% | 38.4% | 0% |
| EFNR | 4.7% | 25.3% | 0.0% |

To combat CW-I2 attacks, the error rate threshold of the detector may be decreased. Table 6 shows the detection rate and effective false negative rate in the case of the first type of modified CW-I2 attacks for different BER thresholds.

TABLE 6

Detection rate and effective false negative rate for the first type of modified CW-I2 attacks with different BER thresholds.

| BER threshold | 0.0025 | 0.005 | 0.0075 | 0.01 |
|---|---|---|---|---|
| Detection rate | 85.1% | 67.5% | 54.6% | 38.4% |
| EFNR | 5.8% | 12.3% | 16.7% | 25.3% |

As shown in Table 6, when the BER threshold is set to 0.0025, the detection rate increases significantly from 38.4% to 85.1%, whereas the effective false negative rate decreases significantly from 25.3% from 5.8%. The improved performance is at the cost of watermarking robustness to multiple rounds of high quality JPEG re-compression. With the BER threshold at 0.0025, the example implementation is very robust to only one round of JPEG re-compression (as shown in Table 2 above).

The experimental results on a subset of the ImageNet validation dataset demonstrate that the methods of watermarking and detection described herein are effective against a wide range of advanced attacks (static and adaptive), achieving a near zero (effective) false negative rate for FGSM and PGD attacks (static and adaptive) with a guaranteed zero false positive rate. It can also be seen that for all tested deep image classifiers (ResNet50V2, MobileNetV2, and InceptionV3), the impact of watermarking on classification accuracy is insignificant with, on average, 0.63% and 0.49% degradation in top 1 and top 5 accuracy, respectively.

While the above description provides examples of one or more processes or apparatuses or systems, it will be appreciated that other processes or apparatuses or systems may be within the scope of the accompanying claims.

It will be appreciated that the embodiments described in this disclosure may be implemented in a number of computing devices, including, without limitation, servers, suitably-programmed general purpose computers, cameras, sensors, audio/video encoding and playback devices, set-top television boxes, television broadcast equipment, mobile devices, and autonomous vehicles. The embodiments described in this disclosure may be implemented by way of hardware or software containing instructions for configuring a processor or processors to carry out the functions described herein. The software instructions may be stored on any suitable non-transitory computer readable memory, including CDs, RAM, ROM, Flash memory, etc.

It will be understood that the embodiments described in this disclosure and the module, routine, process, thread, or other software component implementing the described methods/processes/frameworks may be realized using standard computer programming techniques and languages. The present application is not limited to particular processors, computer languages, computer programming conventions, data structures, other such implementation details. Those skilled in the art will recognize that the described methods/processes may be implemented as a part of computer-executable code stored in volatile or non-volatile memory, as part of an application-specific integrated chip (ASIC), etc.

As will be apparent to a person of skill in the art, certain adaptations and modifications of the described methods/processes/frameworks can be made, and the above discussed embodiments should be considered to be illustrative and not restrictive.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A method for protecting a deep neural network image classifier against receiving perturbed images, the method comprising:

acquiring an original digital image intended for the deep neural network image classifier;

generating a watermarked image by embedding a plurality of watermark bits into the original digital image, wherein embedding the plurality of watermark bits into the original digital image comprises:

identifying a plurality of frequency domain watermark embedding coefficients from the original digital image;

for each frequency domain watermark embedding coefficient, embedding a corresponding embedding value into that watermark embedding coefficient in a frequency domain;

transmitting the watermarked image through a potentially adversarial environment;

receiving a potentially perturbed image from the potentially adversarial environment, wherein the potentially perturbed image is intended for the deep neural network image classifier;

determining whether the potentially perturbed image is an adversely modified or benign image by determining whether the potentially perturbed image includes a plurality of embedded bits in the frequency domain matching the plurality of watermark bits embedded into the original digital image in the frequency domain, wherein the potentially perturbed image is determined to be the benign image when the potentially perturbed image includes the plurality of embedded bits in the frequency domain matching the plurality of watermark bits in the frequency domain and the potentially perturbed image is determined to be the adversely modified image otherwise; and preventing the potentially perturbed image from being provided to the deep neural network image classifier in response to determining that the potentially perturbed image is the adversely modified image;

wherein the plurality of watermark bits embedded into the original digital image in the frequency domain are robust to JPEG re-compression with a quality factor above a pre-defined compression threshold.

2. The method of claim 1, further comprising providing the potentially perturbed image to the deep neural network image classifier in response to determining that the potentially perturbed image is the benign image.

3. The method of claim 1, wherein determining whether the potentially perturbed image includes the plurality of embedded bits matching the plurality of watermark bits embedded into the original digital image comprises:

determining a bit error rate based on comparing the embedded bits with the watermark bits, wherein the bit error rate represents a percentage of the embedded bits that are distorted with respect to the corresponding watermark bits; and determining that the potentially perturbed image includes the plurality of embedded bits matching the plurality of watermark bits when the bit error rate is less than an error rate threshold.

4. The method of claim 1, wherein determining whether the potentially perturbed image includes the plurality of embedded bits matching the plurality of watermark bits comprises:
- identifying a plurality of embedded coefficients of the potentially perturbed image using a secret key associated with the original digital image;
- extracting a plurality of potentially watermarked bits from the plurality of embedded coefficients; and
- determining whether the plurality of potentially watermarked bits correspond to the plurality of watermark bits.

5. The method of claim 4, wherein extracting the plurality of potentially watermarked bits comprises:
- identifying a plurality of potentially watermarked coefficients in the plurality of embedded coefficients;
- determining an estimated reference bit;
- for each potentially watermarked coefficient, extracting the potentially watermarked bit from that potentially watermarked coefficient by:
  - determining an estimated embedding value based on one or more specified bits of that potentially watermarked coefficient; and
  - determining the potentially watermarked bit using the estimated embedding value and the estimated reference bit.

6. The method of claim 5, wherein the estimated reference bit is determined by:
- determining a reference coefficient in the plurality of embedded coefficients;
- determining a reference bit location using a reference switch value associated with the original digital image; and
- determining the estimated reference bit as the bit value at the reference bit location of the reference coefficient.

7. The method of claim 1, wherein embedding the plurality of watermark bits into the original digital image comprises:
- identifying at least one reference embedding coefficient in the original digital image; and
- for each reference embedding coefficient, determining a corresponding reference bit from that reference embedding coefficient.

8. The method of claim 7, wherein each embedding value is defined using the reference bit and a corresponding watermark bit.

9. The method of claim 7, wherein the at least one reference embedding coefficient is determined using a secret key associated with the original digital image.

10. The method of claim 1, wherein the plurality of watermark embedding coefficients are determined using a secret key associated with the original digital image.

11. The method of claim 1, wherein embedding the plurality of watermark bits into the original digital image comprises:
- identifying a plurality of digital image blocks contained in the original digital image; and
- embedding a plurality of block specific watermark bits into each digital image block.

12. The method of claim 1, wherein the frequency domain is a discrete cosine transform (DCT) transformed domain.

13. The method of claim 1, wherein the plurality of watermark bits are embedded into the original digital image at the time the original digital image is generated.

14. A system for protecting a deep neural network image classifier against receiving perturbed images, the system comprising:
- an image acquisition device; and
- a watermark encoder coupled to the image acquisition device; and
- a detector coupled to the deep neural network image classifier;
- wherein
- the image acquisition device is configured to acquire an original digital image intended for the deep neural network image classifier;
- the watermark encoder is configured to:
  - generate a watermarked image by embedding a plurality of watermark bits into the original digital image, wherein embedding the plurality of watermark bits into the original digital image comprises:
    - identifying a plurality of frequency domain watermark embedding coefficients from the original digital image;
    - for each frequency domain watermark embedding coefficient, embedding a corresponding embedding value into that watermark embedding coefficient in a frequency domain; and
  - transmit the watermarked image through a potentially adversarial environment; and
- the detector is configured to:
  - receive a potentially perturbed image from the potentially adversarial environment, wherein the potentially perturbed image is intended for the deep neural network image classifier;
  - determine whether the potentially perturbed image is an adversely modified or benign image by determining whether the potentially perturbed image includes a plurality of embedded bits in the frequency domain matching the plurality of watermark bits embedded into the original digital image in the frequency domain, wherein the potentially perturbed image is determined to be the benign image when the potentially perturbed image includes the plurality of embedded bits in the frequency domain matching the plurality of watermark bits in the frequency domain and the potentially perturbed image is determined to be the adversely modified image otherwise; and
  - prevent the potentially perturbed image from being provided to the deep neural network image classifier in response to determining that the potentially perturbed image is the adversely modified image;
- wherein the plurality of watermark bits embedded into the original digital image in the frequency domain are robust to JPEG re-compression with a quality factor above a pre-defined compression threshold.

15. A method for preventing perturbed images from being provided to a deep neural network image classifier, the method comprising:
- receiving a potentially perturbed image from a potentially adversarial environment, wherein the potentially perturbed image is intended for the deep neural network image classifier;
- identifying a secret key associated with the original digital image of the potentially perturbed image;
- determining a plurality of expected watermark bits associated with the secret key;
- determining whether the potentially perturbed image is an adversely modified or benign image by determining whether the potentially perturbed image includes a plurality of embedded bits matching the plurality of expected watermark bits, wherein the potentially perturbed image is determined to be the benign image when the potentially perturbed image includes the plurality of embedded bits matching the plurality of expected watermark bits and the potentially perturbed image is determined to be the adversely modified image otherwise; and preventing the potentially perturbed image from being provided to the deep neural network image classifier in response to determining that the potentially perturbed image is the adversely modified image;

wherein determining whether the potentially perturbed image includes the plurality of embedded bits matching the plurality of expected watermark bits comprises:
identifying a plurality of embedded coefficients of the potentially perturbed image in a frequency domain using the secret key associated with the original digital image;
extracting a plurality of potentially watermarked bits from the plurality of embedded coefficients in the frequency domain; and
determining whether the plurality of potentially watermarked bits in the frequency correspond to the plurality of expected watermark bits.

16. The method of claim 15, further comprising providing the potentially perturbed image to the deep neural network image classifier in response to determining that the potentially perturbed image is the benign image.

17. The method of claim 15, wherein determining whether the potentially perturbed image includes the plurality of embedded bits matching the plurality of expected watermark bits comprises:
determining a bit error rate based on comparing the embedded bits with the expected watermark bits, wherein the bit error rate represents a percentage of the embedded bits that are distorted with respect to the corresponding expected watermark bits; and
determining that the potentially perturbed image includes the plurality of embedded bits matching the plurality of expected watermark bits when the bit error rate is less than an error rate threshold.

18. The method of claim 10, wherein extracting the plurality of potentially watermarked bits comprises:
identifying a plurality of potentially watermarked coefficients in the plurality of embedded coefficients;
determining an estimated reference bit;
for each potentially watermarked coefficient, extracting the potentially watermarked bit from that potentially watermarked coefficient by:
determining an estimated embedding value based on one or more specified bits of that potentially watermarked coefficient; and
determining the potentially watermarked bit using the estimated embedding value and the estimated reference bit.

19. The method of claim 18, wherein the estimated reference bit is determined by:
determining a reference coefficient in the plurality of embedded coefficients;
determining a reference bit location using a reference switch value associated with the original digital image; and
determining the estimated reference bit as the bit value at the reference bit location of the reference coefficient.

20. The method of claim 14, wherein:
receiving the potentially perturbed image comprises receiving a plurality of potentially perturbed image blocks; and
determining whether the potentially perturbed image includes a plurality of embedded bits matching the plurality of expected watermark bits comprises
determining, for each potentially perturbed image block, whether that potentially perturbed image block includes a plurality of block-specific embedded bits matching a plurality of block-specific expected watermark bits of a corresponding original image block of the original digital image.

\* \* \* \* \*

UNITED STATES PATENT AND TRADEMARK OFFICE
CERTIFICATE OF CORRECTION

| | | |
|---|---|---|
| PATENT NO. | : 12,147,583 B2 | Page 1 of 1 |
| APPLICATION NO. | : 17/719525 | |
| DATED | : November 19, 2024 | |
| INVENTOR(S) | : En-hui Yang and Chen Sun | |

It is certified that error appears in the above-identified patent and that said Letters Patent is hereby corrected as shown below:

In the Specification

Column 17, Line 39:
"DNN C" should recite -- DNN $\mathcal{C}$ --

In the Claims

Claim 18, Column 36, Line 3:
"The method of claim 10…" should recite -- The method of claim 15… --

Claim 20, Column 36, Line 26:
"The method of claim 14…" should recite -- The method of claim 15… --

Signed and Sealed this
Thirteenth Day of May, 2025

Coke Morgan Stewart
*Acting Director of the United States Patent and Trademark Office*